United States Patent
Rhoads

(10) Patent No.: US 6,411,725 B1
(45) Date of Patent: Jun. 25, 2002

(54) WATERMARK ENABLED VIDEO OBJECTS

(75) Inventor: Geoffrey B. Rhoads, West Linn, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/597,209

(22) Filed: Jun. 20, 2000

Related U.S. Application Data

(63) Continuation-in-part of application No. 09/408,902, filed on Sep. 29, 1999, which is a division of application No. 09/130,624, filed on Aug. 6, 1998, now Pat. No. 6,324,573, which is a continuation of application No. 08/508,083, filed on Jul. 27, 1995, now Pat. No. 5,841,978.

(51) Int. Cl.[7] .............................................. G06K 9/00
(52) U.S. Cl. ................................................... 382/100
(58) Field of Search ................................. 382/100, 232; 380/22, 26, 210, 211, 212; 713/176, 179, 181; 399/366; 370/529, 525, 526, 527; 375/137, 326; 348/460, 462, 463, 465; 704/231, 229, 243, 276; 725/13, 14, 18, 19, 20, 21, 31, 38, 39, 40, 41, 61, 88, 90, 102; 381/73.1, 239

(56) References Cited

U.S. PATENT DOCUMENTS

| | | | |
|---|---|---|---|
| 3,569,619 A | 3/1971 | Simjian | 235/380 |
| 3,665,162 A | 5/1972 | Yamamoto et al. | 235/380 |
| 3,703,628 A | 11/1972 | Philipson, Jr. | 235/432 |
| 3,805,238 A | 4/1974 | Rothfjell | 382/118 |
| 3,838,444 A | 9/1974 | Loughlin et al. | 348/486 |
| 3,845,391 A | 10/1974 | Crosby | 455/39 |
| 3,891,829 A | 6/1975 | Dobras | 235/462.04 |
| 3,894,756 A | 7/1975 | Ward | 283/86 |

(List continued on next page.)

FOREIGN PATENT DOCUMENTS

| | | | |
|---|---|---|---|
| DE | 3806411 | 9/1989 | H04B/1/66 |
| EP | 058 482 | 8/1982 | H04M/11/06 |
| EP | 372 601 | 6/1990 | H04B/1/66 |
| EP | 411 232 | 2/1991 | H04N/1/411 |

(List continued on next page.)

OTHER PUBLICATIONS

"Access Control and Copyright Protection for Images, WorkPackage 8: Watermaking," Jun. 30, 1995, 46 pages.
"Access Control and Copyright Protection for Images, WorkPackage 3: Evaluation of Existing Systems," Apr. 19, 1995, 68 pages.
"Access Control and COpyright Protection for Images, WorkPackage 1: Access Control and Copyright Protection for Images Need Evaluation," Jun., 1995, 21 pages.

(List continued on next page.)

*Primary Examiner*—Andrew W. Johns
*Assistant Examiner*—Shervin Nakhjavan
(74) *Attorney, Agent, or Firm*—Steven W. Stewart; Digimarc Corporation

(57) ABSTRACT

Watermarks in video signals or the accompanying audio track are used to associate video objects in a video sequence with object specific actions or information. A video object refers to a spatial and temporal portion of a video signal that depicts a recognizable object, such as a character, prop, graphic, etc. Each frame of a video signal may have one or more video objects. The auxiliary information is embedded in video or audio signals using "steganographic" methods, such as digital watermarks. By encoding object specific information into video or an accompanying audio track, the watermarks transform video objects into "watermark enabled" video objects that provide information, actions or links to additional information or actions during playback of a video or audio-visual program. A similar concept may be applied to audio objects, i.e. portions of audio that are attributable to a particular speaker, character, instrument, artist, etc.

14 Claims, 7 Drawing Sheets

U.S. PATENT DOCUMENTS

| | | | |
|---|---|---|---|
| 3,914,877 A | 10/1975 | Hines | 380/54 |
| 3,922,074 A | 11/1975 | Ikegami et al. | 380/54 |
| 3,984,624 A | 10/1976 | Waggener | 348/473 |
| 4,131,367 A | 12/1978 | French et al. | 356/405 |
| 4,225,967 A | 9/1980 | Miwa et al. | 455/68 |
| 4,230,990 A | 10/1980 | Lert, Jr. et al. | 725/22 |
| 4,231,113 A | 10/1980 | Blasbalg | 380/34 |
| 4,238,849 A | 12/1980 | Gassmann | 370/204 |
| 4,252,995 A | 2/1981 | Schmidt et al. | 381/14 |
| 4,313,197 A | 1/1982 | Maxemchuk | 370/210 |
| 4,325,083 A | 4/1982 | Rouchon et al. | 348/362 |
| 4,345,011 A | 8/1982 | Drexhage | 430/7 |
| 4,367,488 A | 1/1983 | Leventer et al. | 348/467 |
| 4,379,947 A | 4/1983 | Warner | 370/204 |
| 4,380,027 A | 4/1983 | Leventer et al. | 348/467 |
| 4,395,600 A | 7/1983 | Lundy et al. | 381/73.1 |
| 4,414,635 A | 11/1983 | Gast et al. | 382/165 |
| 4,423,415 A | 12/1983 | Goldman | 340/5.86 |
| 4,425,642 A | 1/1984 | Moses et al. | 370/477 |
| 4,476,468 A | 10/1984 | Goldman | 340/5.86 |
| 4,528,588 A | 7/1985 | Lofberg | 340/5.1 |
| 4,532,508 A | 7/1985 | Ruell | 340/5.83 |
| 4,547,074 A | 10/1985 | Hinoda et al. | 356/405 |
| 4,547,804 A | 10/1985 | Greenberg | 348/460 |
| 4,553,261 A | 11/1985 | Froessl | 382/306 |
| 4,590,366 A | 5/1986 | Rothfjell | 235/494 |
| 4,595,950 A | 6/1986 | Lofberg | 380/202 |
| 4,597,495 A | 7/1986 | Knosby | 209/3.3 |
| 4,637,051 A | 1/1987 | Clark | 382/101 |
| 4,654,867 A | 3/1987 | Labedz et al. | 455/438 |
| 4,660,221 A | 4/1987 | Dlugos | 705/62 |
| 4,663,518 A | 5/1987 | Borror et al. | 235/487 |
| 4,665,431 A | 5/1987 | Cooper | 348/480 |
| 4,672,605 A | 6/1987 | Hustig et al. | 370/201 |
| 4,675,746 A | 6/1987 | Tetrick et al. | 358/296 |
| 4,677,435 A | 6/1987 | D'Agraives et al. | 340/5.67 |
| 4,679,068 A | 7/1987 | Lillquist et al. | 348/33 |
| 4,682,794 A | 7/1987 | Margolin | 283/82 |
| 4,703,476 A | 10/1987 | Howard | 370/491 |
| 4,712,103 A | 12/1987 | Gotanda | 340/5.53 |
| 4,718,106 A | 1/1988 | Weinblatt | 455/2.01 |
| 4,739,377 A | 4/1988 | Allen | 355/133 |
| 4,750,173 A | 6/1988 | Bluthgen | 370/528 |
| 4,751,571 A | 6/1988 | Lillquist | 348/164 |
| 4,765,656 A | 8/1988 | Becker et al. | 283/70 |
| 4,775,901 A | 10/1988 | Nakano | 360/60 |
| 4,776,013 A | 10/1988 | Kafri et al. | 380/54 |
| 4,805,020 A | 2/1989 | Greenberg | 348/460 |
| 4,807,031 A | 2/1989 | Broughton et al. | 348/460 |
| 4,811,357 A | 3/1989 | Betts et al. | 375/130 |
| 4,811,408 A | 3/1989 | Goldman | 382/115 |
| 4,820,912 A | 4/1989 | Samyn | 235/449 |
| 4,835,517 A | 5/1989 | van der Gracht et al. | 340/310.07 |
| 4,855,725 A | 8/1989 | Fernandez | 345/173 |
| 4,855,827 A | 8/1989 | Best | 360/60 |
| 4,864,618 A | 9/1989 | Wright et al. | 380/51 |
| 4,866,771 A | 9/1989 | Bain | 707/9 |
| 4,876,617 A | 10/1989 | Best et al. | 360/60 |
| 4,879,747 A | 11/1989 | Leighton et al. | 713/186 |
| 4,884,139 A | 11/1989 | Pommier | 348/21 |
| 4,888,798 A | 12/1989 | Earnest | 705/54 |
| 4,903,301 A | 2/1990 | Kondo et al. | 704/501 |
| 4,908,836 A | 3/1990 | Rushforth et al. | 375/152 |
| 4,908,873 A | 3/1990 | Philibert et al. | 382/100 |
| 4,917,500 A | 4/1990 | Lugos | 356/406 |
| 4,921,278 A | 5/1990 | Shiang et al. | 283/87 |
| 4,939,515 A | 7/1990 | Adelson | 341/51 |
| 4,941,150 A | 7/1990 | Iwasaki | 375/145 |
| 4,943,973 A | 7/1990 | Werner | 375/141 |
| 4,943,976 A | 7/1990 | Ishigaki | 375/142 |
| 4,944,036 A | 7/1990 | Hyatt | 367/43 |
| 4,947,028 A | 8/1990 | Gorog | 235/380 |
| 4,963,998 A | 10/1990 | Maufe | 360/60 |
| 4,965,449 A | 10/1990 | Suzuki et al. | 250/226 |
| 4,965,827 A | 10/1990 | McDonald | 705/65 |
| 4,967,273 A | 10/1990 | Greenberg | 725/22 |
| 4,969,041 A | 11/1990 | O'Grady et al. | 348/473 |
| 4,972,471 A | 11/1990 | Gross et al. | 455/2.01 |
| 4,972,476 A | 11/1990 | Nathans | 713/186 |
| 4,977,594 A | 12/1990 | Shear | 705/53 |
| 4,979,210 A | 12/1990 | Nagata et al. | 360/60 |
| 4,990,092 A | 2/1991 | Cummings | 434/317 |
| 4,993,068 A | 2/1991 | Piosenka et al. | 713/186 |
| 4,996,530 A | 2/1991 | Hilton | 341/120 |
| 4,998,010 A | 3/1991 | Chandler et al. | 235/494 |
| 5,010,405 A | 4/1991 | Schreiber et al. | 348/432.1 |
| 5,023,907 A | 6/1991 | Johnson | 710/200 |
| 5,027,401 A | 6/1991 | Soltesz | 380/54 |
| 5,036,513 A | 7/1991 | Greenblatt | 370/259 |
| 5,047,614 A | 9/1991 | Bianco | 235/385 |
| 5,053,956 A | 10/1991 | Donald et al. | 713/601 |
| 5,059,126 A | 10/1991 | Kimball | 434/308 |
| 5,063,446 A | 11/1991 | Gibson | 348/484 |
| 5,073,899 A | 12/1991 | Collier et al. | 375/135 |
| 5,079,648 A | 1/1992 | Maufe | 360/31 |
| 5,086,469 A | 2/1992 | Gupta et al. | 713/160 |
| 5,095,196 A | 3/1992 | Miyata | 235/382 |
| 5,103,459 A | 4/1992 | Gilhousen et al. | 370/206 |
| 5,113,518 A | 5/1992 | Durst | 713/200 |
| 5,138,712 A | 8/1992 | Corbin | 713/200 |
| 5,146,457 A | 9/1992 | Veldhuis et al. | 370/523 |
| 5,148,498 A | 9/1992 | Resnikoff | 382/248 |
| 5,150,409 A | 9/1992 | Elsner | 713/177 |
| 5,161,210 A | 11/1992 | Druyvesteyn et al. | 704/200 |
| 5,166,676 A | 11/1992 | Milheiser | 340/10.34 |
| 5,181,786 A | 1/1993 | Hujink | 400/61 |
| 5,185,736 A | 2/1993 | Tyrrell et al. | 370/358 |
| 5,199,081 A | 3/1993 | Saito et al. | 382/116 |
| 5,200,822 A | 4/1993 | Bronfin et al. | 725/22 |
| 5,202,828 A | 4/1993 | Vertelney et al. | 707/530 |
| 5,212,551 A | 5/1993 | Conanan | 348/484 |
| 5,213,337 A | 5/1993 | Sherman | 463/40 |
| 5,228,056 A | 7/1993 | Schilling | 375/144 |
| 5,229,841 A | 7/1993 | Taranowski et al. | 356/406 |
| 5,243,423 A | 9/1993 | DeJean et al. | 348/473 |
| 5,245,329 A | 9/1993 | Gokcebay | 340/5.33 |
| 5,253,078 A | 10/1993 | Balkanski et al. | 358/426 |
| 5,258,998 A | 11/1993 | Koide | 375/220 |
| 5,259,025 A | 11/1993 | Monroe | 705/75 |
| 5,262,860 A | 11/1993 | Fitzpatrick | 348/461 |
| 5,267,334 A | 11/1993 | Normille et al. | 382/236 |
| 5,280,537 A | 1/1994 | Sugiyama et al. | 370/527 |
| 5,288,976 A | 2/1994 | Citron | 235/375 |
| 5,293,399 A | 3/1994 | Hefti | 340/10.34 |
| 5,295,203 A | 3/1994 | Krause et al. | 382/248 |
| 5,298,731 A | 3/1994 | Ett | 235/462.02 |
| 5,299,019 A | 3/1994 | Pack et al. | 358/261.3 |
| 5,303,388 A | 4/1994 | Kreitman et al. | 345/836 |
| 5,305,400 A | 4/1994 | Butera | 382/107 |
| 5,315,098 A | 5/1994 | Tow | 235/494 |
| 5,319,453 A | 6/1994 | Copriviza | 346/6 |
| 5,319,724 A | 6/1994 | Blonstein et al. | 382/248 |
| 5,319,735 A | 6/1994 | Preuss et al. | 704/205 |
| 5,325,167 A | 6/1994 | Melen | 356/71 |
| 5,337,358 A | 8/1994 | Axelrod et al. | 705/75 |
| 5,339,095 A | 8/1994 | Redford | 345/158 |
| 5,341,293 A | 8/1994 | Vertelney et al. | 707/530 |
| 5,351,302 A | 9/1994 | Leighton et al. | 380/30 |

| | | | |
|---|---|---|---|
| 5,379,345 A | 1/1995 | Greenberg | 455/2.01 |
| 5,385,371 A | 1/1995 | Izawa | 283/34 |
| 5,394,274 A | 2/1995 | Kahn | 360/27 |
| 5,404,377 A | 4/1995 | Moses | 375/145 |
| 5,408,542 A | 4/1995 | Callahan | 382/244 |
| 5,413,486 A | 5/1995 | Burrows et al. | 434/317 |
| 5,422,963 A | 6/1995 | Chen et al. | 382/232 |
| 5,422,995 A | 6/1995 | Aoki et al. | 345/545 |
| 5,428,607 A | 6/1995 | Hiller et al. | 370/352 |
| 5,428,731 A | 6/1995 | Powers | 707/501.1 |
| 5,432,870 A | 7/1995 | Schwartz | 382/232 |
| 5,437,552 A | 8/1995 | Baer et al. | 434/317 |
| 5,446,273 A | 8/1995 | Leslie | 235/487 |
| 5,450,490 A | 9/1995 | Jensen et al. | 380/253 |
| 5,452,414 A | 9/1995 | Rosendahl et al. | 345/836 |
| 5,459,489 A | 10/1995 | Redford | 345/179 |
| 5,461,711 A | 10/1995 | Wang et al. | 345/720 |
| 5,463,209 A | 10/1995 | Figh | 235/383 |
| 5,466,158 A | 11/1995 | Smith, III | 434/317 |
| 5,469,506 A | 11/1995 | Berson et al. | 713/186 |
| 5,473,631 A | 12/1995 | Moses | 375/130 |
| 5,479,168 A | 12/1995 | Johnson et al. | 341/110 |
| 5,484,292 A | 1/1996 | McTaggart | 434/317 |
| 5,493,677 A | 2/1996 | Balogh | 707/104.1 |
| 5,495,411 A | 2/1996 | Ananda | 705/32 |
| 5,495,581 A | 2/1996 | Tsai | 707/526 |
| 5,496,071 A | 3/1996 | Walsh | 283/70 |
| 5,499,294 A | 3/1996 | Friedman | 713/179 |
| 5,515,081 A | 5/1996 | Vasilik | 345/545 |
| 5,524,933 A | 6/1996 | Kunt et al. | 283/67 |
| 5,525,798 A | 6/1996 | Berson et al. | 250/271 |
| 5,530,852 A | 6/1996 | Meske, Jr. et al. | 709/206 |
| 5,537,336 A | 7/1996 | Joyce | 702/108 |
| 5,545,883 A | 8/1996 | Sasou et al. | 235/449 |
| 5,548,645 A | 8/1996 | Ananda | 705/52 |
| 5,553,143 A | 9/1996 | Ross | 705/59 |
| 5,569,549 A | 10/1996 | Redford | 429/1 |
| 5,579,479 A | 11/1996 | Plum | 713/702 |
| 5,586,216 A | 12/1996 | Degen et al. | 704/276 |
| 5,587,784 A | 12/1996 | Pines et al. | 356/4.01 |
| 5,597,307 A | 1/1997 | Redford et al. | 434/118 |
| 5,604,516 A | 2/1997 | Herrod et al. | 345/168 |
| 5,606,609 A * | 2/1997 | Houser et al. | 713/179 |
| 5,613,004 A | 3/1997 | Cooperman et al. | 380/28 |
| 5,624,265 A | 4/1997 | Redford et al. | 434/307 R |
| 5,629,980 A | 5/1997 | Stefik | 705/54 |
| 5,634,012 A | 5/1997 | Stefik | 705/39 |
| 5,636,276 A | 6/1997 | Brugger | 705/54 |
| 5,638,443 A | 6/1997 | Stefik | 705/54 |
| 5,640,193 A | 6/1997 | Wellner | 725/100 |
| 5,646,997 A | 7/1997 | Barton | 713/176 |
| 5,646,999 A | 7/1997 | Saito | 705/54 |
| 5,650,608 A | 7/1997 | Redford et al. | 250/210 |
| 5,652,626 A | 7/1997 | Kawakami et al. | 348/463 |
| 5,652,714 A | 7/1997 | Peterson | 702/57 |
| 5,657,462 A | 8/1997 | Brouwer | 345/709 |
| 5,659,164 A | 8/1997 | Schmid | 235/375 |
| 5,663,766 A | 9/1997 | Sizer, II | 348/473 |
| 5,689,587 A | 11/1997 | Bender et al. | 382/232 |
| 5,693,693 A | 12/1997 | Auslander et al. | 524/88 |
| 5,715,403 A | 2/1998 | Stefik | 705/44 |
| 5,721,788 A | 2/1998 | Powell | 382/100 |
| 5,729,251 A | 3/1998 | Nakashima | 709/250 |
| 5,734,119 A | 3/1998 | France | 84/622 |
| 5,739,814 A | 4/1998 | Ohara et al. | 345/173 |
| 5,745,569 A * | 4/1998 | Moskowitz et al. | 705/58 |
| 5,765,152 A | 6/1998 | Erickson | 707/9 |
| 5,774,452 A | 6/1998 | Wolosewicz | 370/212 |
| 5,801,687 A | 9/1998 | Peterson | 707/500.1 |
| 5,809,317 A | 9/1998 | Kogan | 707/501.1 |
| 5,818,441 A | 10/1998 | Throckmorton | 345/717 |
| 5,822,432 A * | 10/1998 | Moskowitz et al. | 380/28 |
| 5,828,325 A | 10/1998 | Wolosewicz et al. | 341/52 |
| 5,841,978 A * | 11/1998 | Rhoads | 709/217 |
| 5,845,281 A | 12/1998 | Benson | 707/9 |
| 5,848,413 A | 12/1998 | Wolff | 707/10 |
| 5,848,424 A | 12/1998 | Scheinkman | 707/501.1 |
| 5,852,673 A | 12/1998 | Young | 382/164 |
| 5,857,038 A | 1/1999 | Owada et al. | 382/284 |
| 5,862,260 A | 1/1999 | Rhoads | 382/232 |
| 5,862,321 A | 1/1999 | Lamming et al. | 709/200 |
| 5,869,819 A | 2/1999 | Knowles et al. | 235/375 |
| 5,872,589 A | 2/1999 | Morales | 725/24 |
| 5,886,337 A | 3/1999 | Rockstein et al. | 235/472.01 |
| 5,892,900 A | 4/1999 | Ginter et al. | 713/200 |
| 5,893,910 A | 4/1999 | Martineau | 707/10 |
| 5,896,454 A * | 4/1999 | Cookson et al. | 360/60 |
| 5,905,248 A | 5/1999 | Russell et al. | 235/462.15 |
| 5,920,861 A | 7/1999 | Hall | 707/9 |
| 5,920,878 A | 7/1999 | DeMont | 707/513 |
| 5,926,822 A | 7/1999 | Garman | 707/503 |
| 5,932,863 A | 8/1999 | Rathus | 235/462.15 |
| 5,974,141 A | 10/1999 | Saito | 705/52 |
| 5,983,218 A | 11/1999 | Suyeda-Mahmoo | 707/3 |
| 5,991,876 A | 11/1999 | Johnson | 713/200 |
| 6,031,815 A * | 2/2000 | Heemskerk | 369/275.3 |
| 6,081,827 A | 6/2000 | Reber et al. | 709/200 |
| 6,177,931 B1 * | 1/2001 | Alexander et al. | 345/327 |
| 6,226,387 B1 | 5/2001 | Tewfik et al. | 382/100 |
| 6,256,638 B1 | 7/2001 | Dougherty | 707/104.1 |
| 6,269,394 B1 * | 7/2001 | Kenner et al. | 709/217 |

FOREIGN PATENT DOCUMENTS

| | | | |
|---|---|---|---|
| EP | 441 702 | 8/1991 | G11B/20/00 |
| EP | 493 091 | 7/1992 | H04N/1/387 |
| EP | 581 317 | 2/1994 | G07D/7/00 |
| EP | 629 972 | 12/1994 | G06K/15/02 |
| EP | 650 146 A1 | 4/1995 | G07C/9/00 |
| EP | 705 025 A2 | 4/1996 | H04N/1/40 |
| GB | 2063018 | 5/1981 | H04M/11/06 |
| GB | 2067871 | 7/1981 | H04N/7/16 |
| GB | 2196167 | 4/1988 | G11B/20/08 |
| GB | 2204984 | 11/1988 | G11B/23/28 |
| JP | 4-248771 | 9/1992 | H04N/1/44 |
| JP | 5-242217 | 9/1993 | G06F/15/62 |
| JP | 7-108786 | 4/1995 | B42D/15/00 |
| JP | 7-093567 | 9/1995 | G06T/11/00 |
| WO | 89/08915 | 9/1989 | G11B/20/10 |
| WO | 94/27228 | 11/1994 | G06F/15/20 |
| WO | 95/10835 | 4/1995 | G11B/31/00 |
| WO | 95/14289 | 5/1995 | G06K/19/14 |
| WO | 95/20291 | 7/1995 | H04N/1/32 |
| WO | 96/01464 | 1/1996 | G05B/15/07 |
| WO | 96/03736 | 2/1996 | G09G/5/00 |
| WO | 96/19795 | 6/1996 | G09G/5/00 |
| WO | 96/19821 | 6/1996 | H01J/40/14 |
| WO | 96/27259 | 9/1996 | H04N/1/32 |
| WO | 96/29749 | 9/1996 | H01M/2/20 |
| WO | 96/36163 | 11/1996 | H04N/1/32 |
| WO | 97/01137 | 1/1997 | G06F/3/06 |
| WO | 97/02552 | 1/1997 | G06F/1/00 |
| WO | 97/32262 | 9/1997 | G06F/17/00 |

OTHER PUBLICATIONS

Arachelian, "White Noise Storm," Apr. 11, 1994, Internet reference, 13 pages.

Arthur, "Digital Fingerprints Protect Artwork," New Scientist, Nov. 12, 1994, p. 24.

Bender et al., "Techniques for Data Hiding," Massachusetts Institute of Technology, Media Laboratory, Jan. 1995, 10 pages.

Boland et al, "Watermarking Digital Images for Copyright Protection," Fifth International Conference on Image Processing and its Applications, Conference Date Jul. 4–6, 1995, Conf. Publ. No. 410, pp. 326–330.

Boneh, "Collusion–Secure Fingerprinting for Digital Data," Department of Computer Science, Princeton University, 1995, 31 pages.

Brassil et al., Electronic Marking and Identification Techniques to Discourage Document Copying Proceedings of INFOCOM '94 Conference on Computer, IEEE Commun. Soc Conference, Jun. 12–16, 1994, 1278–1287.

Brown, "S–Tools for Windows, Version 1.00, .Copyrgt.1994 Andy Brown, What is Steganography," Internet reference, Mar. 6, 1994, 6 pages.

Bruckstein, A.M.; Richardson, T.J., A holographic transform domain image watermarking method, Circuits, Systems, and Signal Processing vol. 17, No. 3 p. 361–89, 1998. This paper includes an appendix containing an internal memo of Bell Labs, which according to the authors of the paper, was dated Sep. 1994.

Caronni, "Assuring Ownership Rights for Digital Images," Published in the Proceedings of 'Reliable It Systems,' vis '95, HH. Bruggermann and W. Gerhardt–Hackl (Ed.), Vieweg Publishing Company, Germany, 1995, Jun. 14, 1994, 10 pages.

Choudhury, et al., "Copyright Protection for Electronic Publishing over Computer Networks," IEEE Network Magazine, Jun. 1994, 18 pages.

Clarke, "Invisible Code Tags Electronic Images," Electronic Engineering Times, Jun. 12, 1995, n. 852, p. 42.

"The Copyright Can of Worms Opened Up By The New Electronic Media," Computergram Internations, pCGN0717006, Jul. 17, 1995 and The Copyright Can of Worms Opened Up By the New Electronic Media—2, Computergram Internations, pCGN07210008, Jul. 21, 1995, 3 pages.

"Copyright Protection for Digital Images, Digital Fingerprinting from FBI," Highwater FBI brochure, 1995, 4 pages.

"Cyphertech Systems: Introduces Digital Encoding Device to Prevent TV Piracy," Hollywood Reporter, Oct. 20, 1993, p. 23.

Dautzenberg, "Watermarking Images," Department of Microelectronics and Electrical Engineering, Trinity College Dublin, 47 pages, Oct. 1994.

de Castro et al., "Registration of Translated and Rotated Images Using Finite Fourier Transforms," IEEE Transactions on Pattern Analysis and Machine Intelligence, vol. PAMI–9, No. 5, Sep. 1987, pp. 700–703.

Fitzgerald, "Invinsible Digital Copyright ID," Editor & Publisher, Jun. 25, 1994, p. 62.

"Foiling Card Forgers With Magnetic 'Noise'," Wall Street Journal, Feb. 8, 1994.

Friedman, "The Trustworthy Digital Camera: Restoring Credibility to the Photographic Image," IEEE Transactions on Consumer Electronics, vol. 39, No. 4, Nov., 1993, pp. 905–910.

Hartung et al., "Digital Watermarking of MPEG–4 Facial Animation Parameters," Computers & Graphics, vol. 22, No. 3, 1998, 17 pages.

Hartung et al., "Watermarking of Uncompressed and Compressed Video," Signal Process, vol. 66, No. 3, May 1998, pp. 283–301.

Hecth, "Embedded Data Glyph Technology for Hardcopy Digital Documents," SPIE vol. 2171, Feb. 1994, pp. 341–352.

"High Water FBI Limited Presentation Image Copyright Protection Software," FBI Ltd brochure, Jul., 1995, 17 pages.

Humphrey, "Stamping Out Crime," Hollywood Reporter, Jan. 26, 1994, p. S48.*

Jain, "Image Coding Via a Nearest Neighbors Image Model," IEEE Transactions on Communications, vol. COM–23, No. 3, Mar. 1975, pp. 318–331.

JPEG Group's JPEG Software (release 4), ftp.csua.berekeley.edu/pub/cypherpunks/applications/jsteg/jpeg.announcement.gz, Jun. 7, 1993, 2 pages.

Kassam, Signal Detection in Non–Gaussian Noise, Dowden & Culver, 1988, pp. 1–96.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20–22, 1995, 4 pages.

Komatsu et al., "A Proposal on Digital Watermarking in Document Image Communication and its Application to Realizing a Signature," Electronic and Communications in Japan, Part 1, vol. 73, No. 5, 1990, pp. 22–23.

Komatsu et al., "Authentication System Using Concealed Image in Telematics," Memoirs of the School. of Science & Engineering, Waseda Univ., No. 52, 1988, pp. 45–60.

Kurak et al., "A Cautionary Not On Image Downgrading," 1992 IEEE, pp. 153–159.

Luc, "Analysis of Spread Spectrum System Parameters for Design of Hidden Transmission," Radioengineering, vol. 4, No. 2, Jun. 1995, pp. 26–29.

Machado, "Announcing Stego 1.0a2, The First Steganography Tool for the Macintosh," Internet reference, Nov. 28, 3 pages.

Macq, "Cryptology for Digital TV Broadcasting," Proceedings of the IEEE, vol. 83, No. 6, Jun. 1995, pp. 944–957.

Matsui et al., "Video–Steganography: How to Secretly Embed a Signature in a Picture," IMA Intellectual Property Project Proceedings, Jan. 1994, vol. 1, Issue 1, pp. 187–205.

Matthews, "When Seeing is Not Believing," New Scientist, Oct. 16, 1993, pp. 13–15.

Mintzer et al., "Safeguarding Digital library Contents and Users" Digital Watermarking, D–Lib Magazine, Dec. 1997: ISSN 1082–9873.

Moller, et al., "Rechnergestutzte Steganographie: Wie sie Funkioniert und warum folglich jede Reglementierung von Verschlusselung unsinnig ist," DuD, Datenschutz und Datensicherung, 18/6 (1994) 318–326.

"Multimedia Mixed Object Envelopes Supporting a Graduated Fee Scheme via Encryption," IBM Technical Discosure Bulletin: vol. 37, No. 03, Mar. 1994, p. 413.

"NAB—Cyphertech Starts Anti–Piracy Broadcast Tests," Newsbytes, NEW03230023, Mar. 23, 1994.

Nakamura et al. "A Unified Coding Method of Dithered Image and Text Data Using Micropatterns," Electronics and Communications in Japan, Part 1, vol. 72, No. 4, 1989, pp. 50–56.

Nakamura et al., "A Unified Coding Method of Image and Text Data Using Discrete Orthogonal Transform," Systems and Computers in Japan, vol. 21, No. 3, 1990, pp. 87–92.

Quisquater et al., "Access Control and COpyright Protection for Images, Conditional Access and Copyright Protection Based on the Use of Trusted Third Parties," 1995, 43 pages.

Pennebaker et al., JPEG Still Image Data Compression Standard, Chapter 3, "Aspects of the Human Visual System," pp. 23–27, 1993, Van Nostrand Reinhold, New York.

Pitas et al., "Applying Signatures on Digital Images," IEEE Workshop on Nonlinear Image and Signal Processing, Neos Marmaras, Greece, pp. 460–463, Jun., 1995.

Port, "Halting Highway Robbery on the Internet," Business Week, Oct. 17, 1994, p. 212.

Rindfrey, "Towards an Equitable System for Access Control and Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Roberts, "Picture Coding Using Pseudorandom Noise," IRE Trans. on Information Theory, vol. 8, No. 2, Feb., 1962, pp. 145–154.

Sandford II, et al., "The Data Embedded Method," SPIE vol. 2615, Oct. 23, 1995, pp. 226–259.

Sapwater et al., "Electronic Copyright Protection," PHOTO>Electronic Imaging, vol. 37, No. 6, 1994, pp. 16–21.

Schneier, "Digital Signatures, Cryptographic Algorithms Can Create Nonforgeable Signatures for Electronic Documents, Making Them Valid Legal Instruments" BYTE, Nov. 1993, pp. 309–312.

Schreiber et al., "A Compatible High–Definition Television System Using the Noise–Margin Method of Hiding Enhancement Information," SMPTE Journal, Dec. 1989, pp. 873–879.

shaggy@phanton.com, "Hide and Seek v. 4.0" Internet reference, Apr. 10, 1994, 3 pages.

Sheng et al., "Experiments on Pattern Recognition Using Invariant Fourier–Mellin Descriptiors," Journal of Optical Society of America, vol. 3, No. 6, Jun., 1986, pp. 71–776.

Short, "Steps Toward Unmasking Secure Communications," International Journal of Bifurcation and Chaos, vol. 4, No. 4, 1994, pp. 959–977.

Simmons, "Subliminal Channels: Past and Present," ETT, vol. 5, No. 4, Jul.–Aug. 1994, pp. 45–59.

Swanson et al., "Object–Based Transparent Video Watermarking," IEEE Signal Processing Society 1997 Workshop on Multimedia Signal Processing, Jun. 23–25, 1997, 8 pages.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Tanaka et al., "A Visual Retrieval System with Private Information for Image Database," Proceeding International Conference on DSP Applications and Technology, Oct. 1991, pp. 415–421.

Tanaka et al., "Embedding Secret Information Into a Dithered Multi–Level Image," Proc. IEEE Military Comm. Conf., Sep. 1990, pp. 216–220.

Tanaka et al., "New Integrated Coding Schemes for Computer–Aided Facsimile," Proc. IEEE Int'l Conf. on Sys. Integration, Apr. 1990, pp. 275–281.

Tanaka, "Embedding the Attribute Information Into a Dithered Image," Systems and Computers in Japan, vol. 21, No. 7, 1990, pp. 43–50.

"Technological Strategies for Protecting Intellectual Property in the Networks Multimedia Environment," Interactive Multimedia Assn: MIT Program on Digital Open Resolution Systems, vol. 1 issue 1, Jan. 1994 Journal of the Interactive Multimedia Assn Intellectual Property Project.

Tirkel et al, "Electronic Water Mark," DICTA–93, Macquarie University, Sydney, Australia, Dec., 1993, pp. 666–673.

Toga et al., "Registration Revisted," Journal of Neuroscience Methods, 48 (1993), pp. 1–13.

van Schyndel et al., "A Digital Watermark," IEEE International Conference on Image Processing, Nov. 13–16, 1994, pp. 86–90.

Wagner, "Fingerprinting," 1983 IEEE, pp. 18–22.

Walton, "Image Authentication for a Slippery New Age," Dr. Dobb's Journal, Apr. 1995, pp. 18–26, 82–87.

Weber et al., "Correlative Image Registration," Seminars in Nuclear Medicine, vol. XXIV, No. 4, Oct., 1994, pp. 311–323.

Wise, "The History of Copyright, Photographers' Rights Span Three Centuries," PHOTO>Electronic Imaging, vol. 37, No. 6, 1994.

Wu et al., Object–Based Multiresolution Watermarking of Images and Video, ISCAS 2000–IEEE International Symposium on Circuits and Systems, May 28–31, 2000, 2000 IEEE, pp. 1–212–1215.

Yeung et al., "Fragile Watermarking of Three–Dimensional Objects," 1998 IEEE, 5 pages.

* cited by examiner

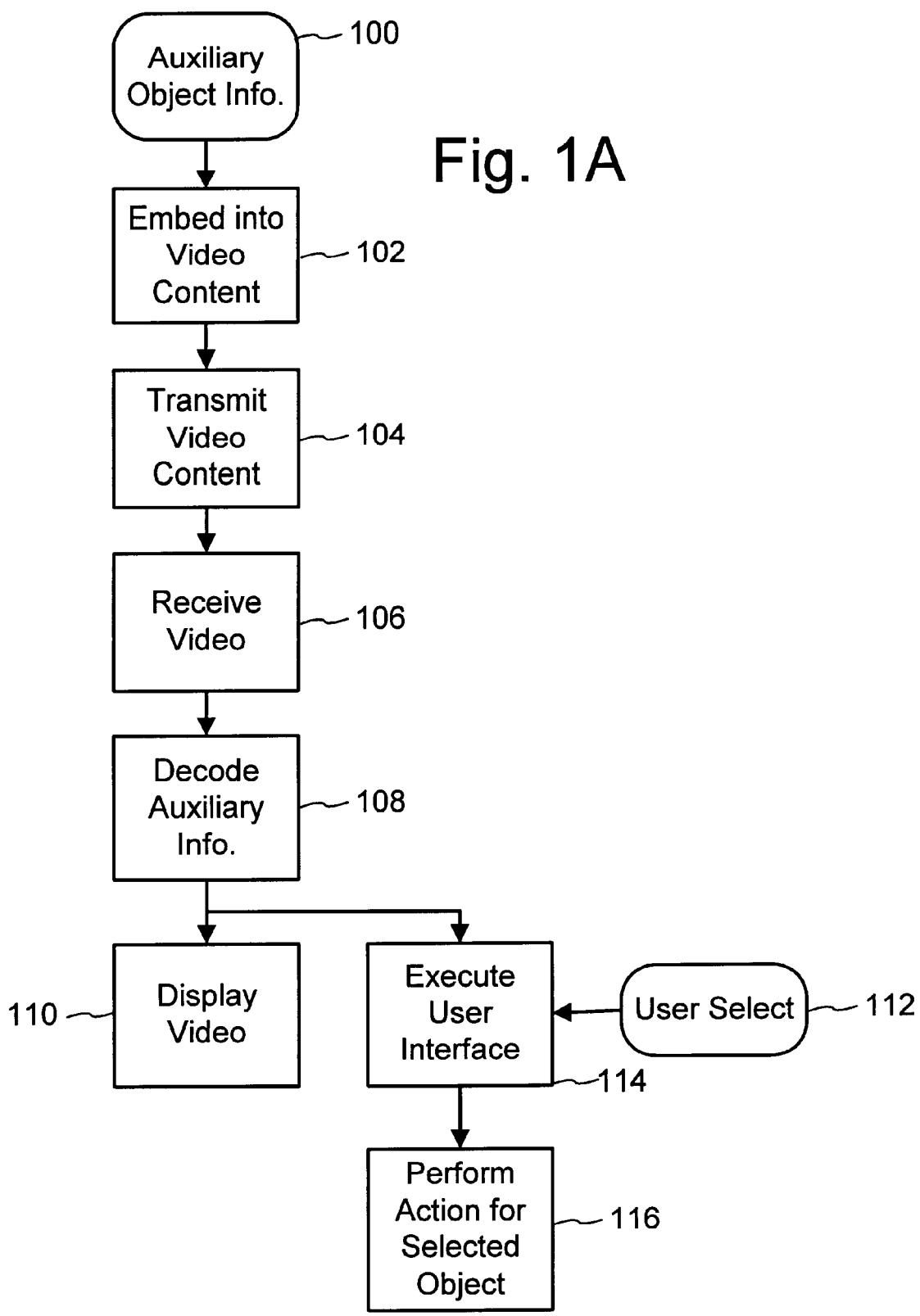

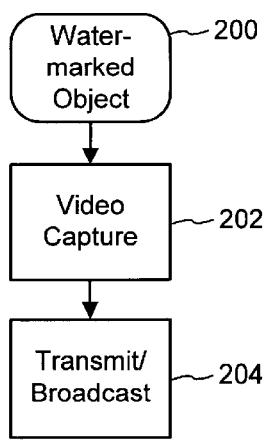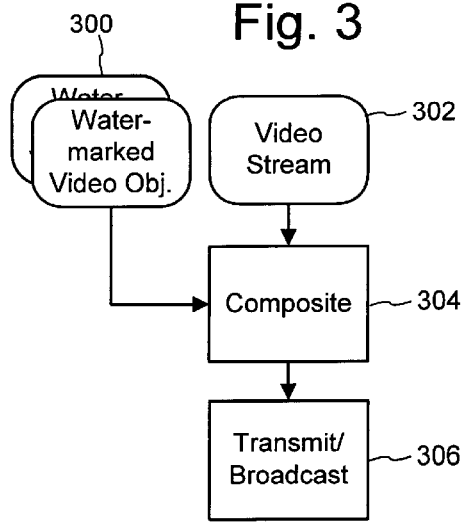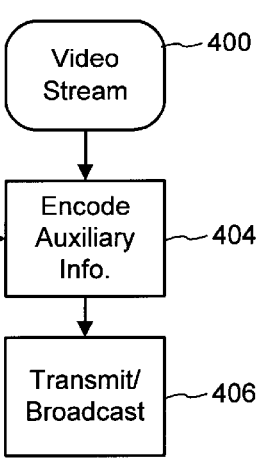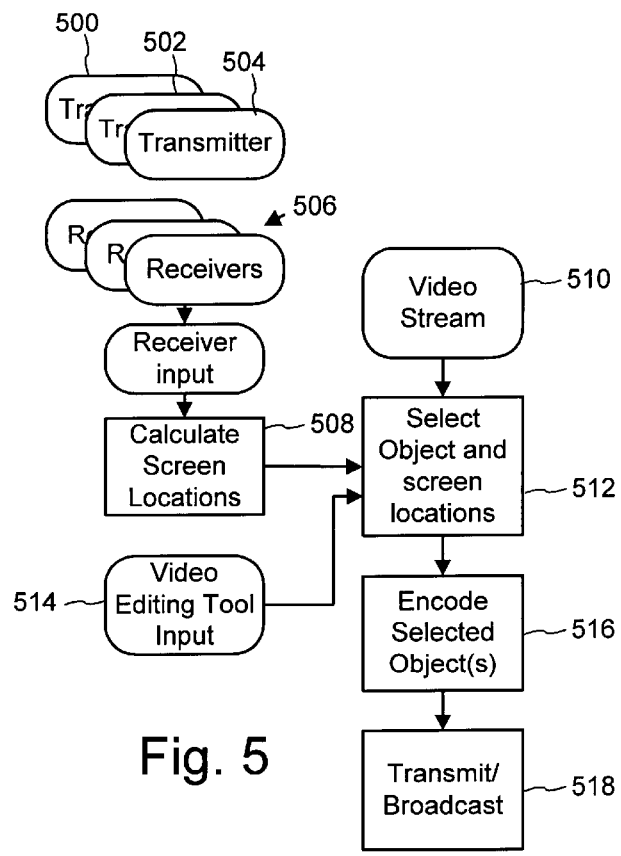

WATERMARK ENABLED VIDEO OBJECTS

RELATED APPLICATION DATA

This application is a continuation in part of copending U.S. patent application Ser. No. 09/408,902, which was filed Sep. 29, 1999. The Ser. No. 09/408,902 patent application is a divisional of U.S. patent application Ser. No. 09/130,624, filed Aug. 6, 1998, now U.S. Pat. No. 6,324,573, which is a continuation of U.S. patent application Ser. No. 08/508,083, filed Jul. 27, 1995, now U.S. Pat. No. 5,841,978.

The subject matter of the present application is related to that disclosed in U.S. Pat. No. 5,862,260, and in co-pending U.S. patent applications:

Ser. No. 09/503,881, filed Feb. 14, 2000;
No. 60/082,228, filed Apr. 16, 1998;
Ser. No. 09/292,569, filed Apr. 15, 1999;
No. 60/134,782, filed May 19, 1999;
Ser. No. 09/343,104, filed Jun. 29, 1999;
No. 60/141,763, filed Jun. 30, 1999;
Ser. No. 09/562,517, filed May 1, 2000;
Ser. No. 09/531,076, filed Mar. 18, 2000 and
Ser. No. 09/571,422, filed May 15, 2000;

which are hereby incorporated by reference.

TECHNICAL FIELD

The invention relates to multimedia signal processing, and in particular relates to encoding information into and decoding information from video objects.

BACKGROUND AND SUMMARY

"Steganography" refers to methods of hiding auxiliary information in other information. Audio and video watermarking are examples of steganography. Digital watermarking is a process for modifying media content to embed a machine-readable code into the data content. A media signal, such as an image or audio signal, is modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an embedding component that embeds the watermark in the media content, and a reading component that detects and reads the embedded watermark. The embedding component embeds a watermark by altering data samples of the media content. The reading component analyzes content to detect whether a watermark is present. In applications where the watermark encodes information, the reader extracts this information from the detected watermark.

The invention provides methods and systems for associating video objects in a video sequence with object specific actions or information using auxiliary information embedded in video frames or audio tracks. A video object refers to a spatial and temporal portion of a video signal that depicts a recognizable object, such as a character, prop, graphic, etc. Each frame of a video signal may have one or more video objects. The auxiliary information is embedded in video or audio signals using "steganographic" methods, such as digital watermarks. By encoding object specific information into video or an accompanying audio track, the watermarks transform video objects into "watermark enabled" video objects that provide information, actions or links to additional information or actions during playback of a video or audio-visual program. A similar concept may be applied to audio objects, i.e. portions of audio that are attributable to a particular speaker, character, instrument, artist, etc.

One aspect of the invention is a method for encoding substantially imperceptible auxiliary information about a video object into a video signal that includes at least one video object. The method steganographically encodes object specific information about the video object into the video signal. Some examples of this information include identifiers and screen locations of corresponding video objects. The method associates the object specific information with an action. This action is performed automatically or in response to user selection of the video object through a user interface while the video signal is playing.

Another aspect of the invention is a method for encoding substantially imperceptible auxiliary information into physical objects so that the information survives the video capture process and links the video to an action. This method steganographically encodes auxiliary information in a physical object in a manner that enables the auxiliary information to be decoded from a video signal captured of the physical object. One example is to place a watermarked image on the surface of the object. The method associates the auxiliary information with an action so that the video signal captured of the physical object is linked to the action. One example of an action is retrieving and displaying information about the object. For example, the watermark may act as a dynamic link to a web site that provides information about the object.

Another aspect of the invention is a method for using a watermark that has been encoded into a video signal or in an audio track accompanying the video signal. The watermark conveys information about a video object in the video signal. The method decodes the information from the watermark, receives a user selection of the video object, and executes an action associated with the information about the video object. One example of an action is to retrieve a web site associated with the video object via the watermark. The watermark may include a direct (e.g., URL or network address) or indirect link (e.g., object identifier) to the web site. In the latter case, the object identifier may be used to look up a corresponding action, such as issuing a request to a web server at a desired URL. Object information returned to the user (e.g., web page) may be rendered and superimposed on the same display as the one displaying the video signal, or a separate user interface.

Another aspect of the invention is a system for creating watermark enabled video objects. The system includes an encoder for encoding a watermark in a video sequence or accompanying audio track corresponding to a video object or objects in the video sequence. It also includes a database system for associating the watermark with an action or information such that the watermark operable to link the video object or objects to a related action or information during playback of the video sequence.

Another aspect of the invention is a system for processing a watermark enabled video object in a video signal. The system comprises a watermark decoder and rendering system. The watermark decoder decodes a watermark carrying object specific information from the video signal and linking object specific information to an action or information. The rendering system renders the action or information.

Another aspect of the invention is a method for encoding substantially imperceptible auxiliary information into an audio track of a video signal including at least one video object. This method steganographically encodes object specific information about the video object into the audio track. It also associates the object specific information with an action, where the action is performed in response to user selection of the video object through a user interface while the video signal is playing. Alternatively, the action can be performed automatically as the video is played.

Further features will become apparent with reference to the following detailed description and accompanying drawings.

BRIEF DESCRIPTION OF THE DRAWINGS

FIG. 1A is a flow diagram depicting a process for encoding and decoding watermarks in content to convey auxiliary information 100 about video objects in the content.

FIG. 2 is a flow diagram depicting a video creation process in which physical objects are pre-watermarked in a manner that survives video capture and transmission.

FIG. 3 is a flow diagram of a video creation process that composites watermarked video objects with a video stream to create a watermarked video sequence.

FIG. 4 illustrates an embedding process for encoding auxiliary information about video objects in a video stream.

FIG. 5 is a diagram depicting yet another process for encoding auxiliary information about video objects in a video stream.

DETAILED DESCRIPTION

Figure 1B:
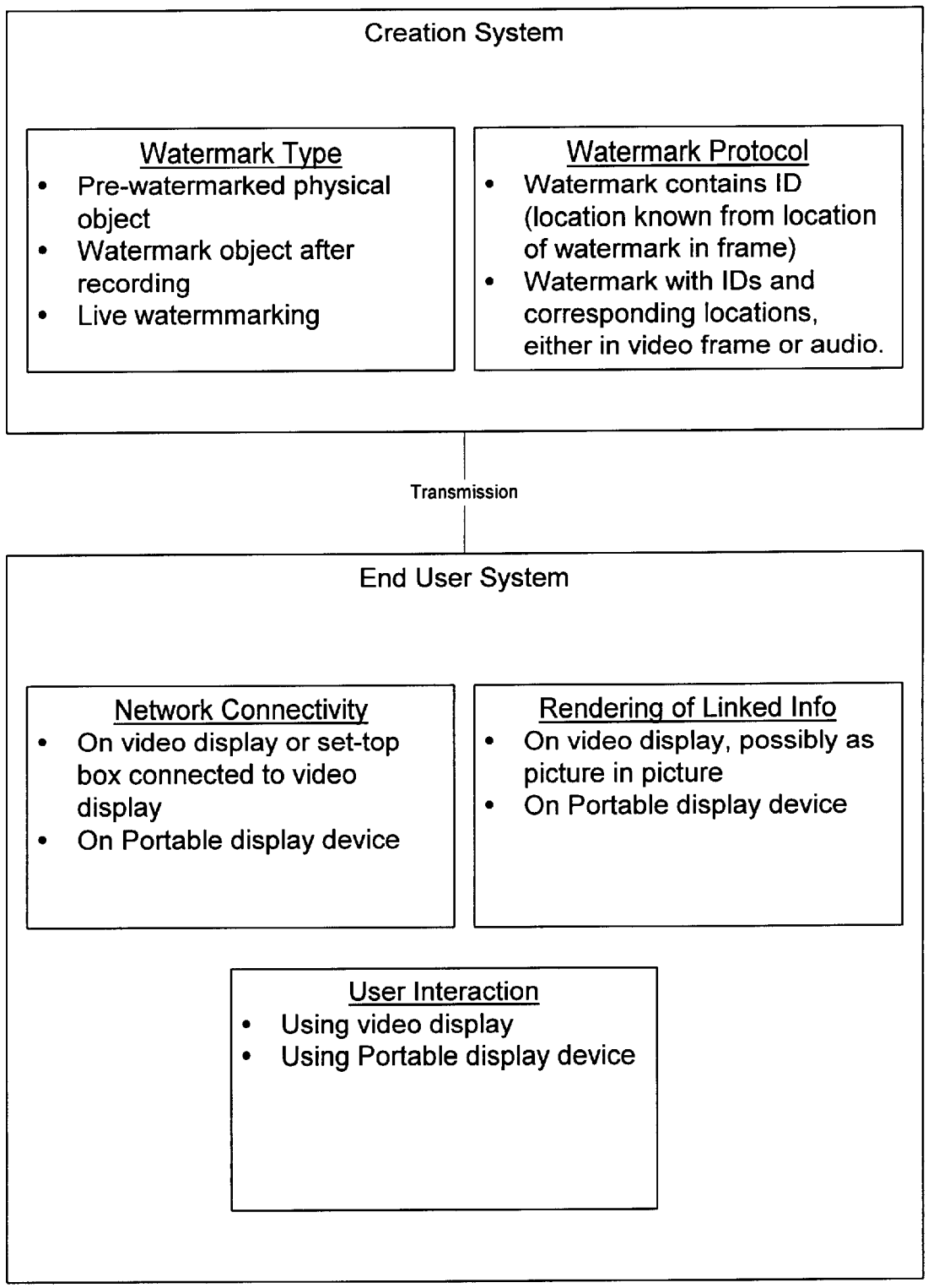
FIG. 1B illustrates a framework outlining several alternative implementations of linking video objects with actions or information.

The following sections detail ways to encode and decode information, actions and links into video objects in a video sequence. A video object refers to a video signal depicting an object of a scene in a video sequence.

To a viewer, the video object is recognizable and distinguishable from other imagery in the scene. The video object exists in a video sequence for some duration, such as a contiguous set of video frames. A single image instance in a frame corresponding to the object is a video object layer. The video object may comprise a sequence of natural images that occupy a portion of each frame in a video sequence, such as a nearly static talking head or a moving athlete. Alternatively, the video object may be a computer generated rendering of a graphical object that is layered with other renderings or natural images to form each frame in a video sequence. In some cases, the video object may encompass an entire frame.

In the systems described below, watermarks are encoded and decoded from video or audio tracks for the purpose of conveying information related to the video objects. A watermark encoding process embeds a watermark into an audio or video signal, or in some cases, the physical object that later becomes a video object through video capture. At playback, a decoding process extracts the watermark.

FIG. 1A is a flow diagram depicting a process for encoding and decoding watermarks in content to convey auxiliary information 100 about video objects in the content. An embedding process 102 encodes the auxiliary information into a watermark embedded in the video content. A transmitter 104 then distributes the content to viewers, via broadcast, electronic file download over a network, streaming delivery over a network, etc. A receiver 106 captures the video content and places it in a format from which a watermark decoder 108 extracts the auxiliary information. A display 110 displays the video to a viewer. As the video is being displayed, a user interface 114 executes and provides visual, audio, or audio-visual information to the user indicating that the video is embedded with auxiliary information or actions. This user interface may be implemented by superimposing graphical information over the video on the display 110. Alternatively, the decoder can pass auxiliary object information to a separate device, which in turn, executes a user interface. In either case, the user interface receives input from the user, selecting a video object. In response, it performs an action associated with the selected object using the auxiliary object information decoded from the watermark.

The watermark may carry information or programmatic action. It may also link to external information or an action, such as retrieval and output of information stored elsewhere in a database, website, etc. Watermark linking enables the action associated with the watermark to be dynamic. In particular, the link embedded in the content may remain the same, but the action or information it corresponds to may be changed.

Watermark linking of video objects allows a video object in a video frame to trigger retrieval of information or other action in response to selection by a user. Watermark embedding may be performed at numerous and varied points of the video generation process. For 3D animation, the watermark can be embedded immediately into a video object layer after a graphical model is rendered to the video object layer, allowing a robust and persistent watermark to travel from the encoding device or computer to any form of playback of video containing the video object.

For special effects, an actor filmed against a green screen can be embedded directly after the film is transferred to digital format for effects generation, preventing the need to later extract the actor from the background to embed only his image. For network or cable broadcast news, the ubiquitous pop-up screen that appears next to the news anchor's head can be embedded before the newscast allowing the viewer to click on that image to take them to extra information from a website.

Watermarks may be embedded in broadcast video objects in real time. An example is watermarking NBA basketball players as a game is broadcast allowing the view to click on players and receive more information about them.

Wherever the video is distributed, a decoding process may be inserted to decode information about the video object from a watermark embedded in the video signal. This information may then be used to trigger an action, such as fetching graphics and displaying it to the user. For example, the watermark information may be forwarded to a database, which associates an action with the watermark information.

One form of such a database is detailed in co-pending application Ser. No. 09/571,422, which is hereby incorporated by reference. This database looks up an action associated with watermark information extracted from content. One action is to issue a query to a web server, which in turn, returns a web page to the user via the Internet, or some other communication link or network.

FIG. 1B illustrates a system architecture outlining several alternative implementations of linking video objects with actions or information. This diagram divides the system into a creation side, where content is created and encoded, and an end user side, where content and watermark enabled information or actions are rendered. On the creation side, the diagram shows examples of three watermark types and two watermark protocols. In type one, the watermark is embedded in a physical object before it is recorded in a video signal. In type two, the watermark is encoded in a video object after it is recorded but before it is broadcast, possibly during a video editing process. For example, this type of watermark may be encoded in a video object of an actor captured in front of a greenscreen as he moves through a scene. In type three, the watermark is added as the video is being captured for a live event, such as watermarking a video object depicting the jersey of a basketball player as a video stream is being captured of a game.

In the first protocol, the watermark is encoded in the video frame area of the desired object, such as where the jersey of the basketball player appears on the video display screen. In the second protocol, the watermark is encoded throughout a video frame or corresponding segment of an audio track, and includes information about the object and its location. For example, during the basketball game, the watermark is embedded in the audio track and includes location, size and identification for player 1, then player 2, then player 3, and back to player 1 if he is still in the scene or onto player 2 or 3, etc.

On the end user side, there are two places for network connectivity, rendering of linked information, and user interaction. Internet connectivity can be included in the video display device or associated set-top box or in a portable display device, such as a personal laptop. The rendering of the linked information can occur on the video display, possibly using picture-in-picture technology so others can still see the original video, or in the portable display device, such as a laptop since Internet browsing can be a personal experience. User interaction with the system, such as selecting the object to find linked information can happen with the video display, such as pointing with a remote, or with a portable display device, such as using a mouse on a laptop. Specific implementations can include a variety of combination of these components.

Embedding Processes

The embedding process encodes one or more watermarks into frames of a video sequence, or in some cases, an audio track that accompanies the video sequence. These watermarks carry information about at least one video object in the sequence, and also create an association between a video object and an action or external information. The association may be formed using a variety of methods.

One method is to encode an object identifier in a watermark. On the decoding side, this identifier is used as a key or index to an action or information about a video object. The identifier may be a direct link to information or actions (e.g., an address of the information or action), or be linked to the information or actions via a server database.

Another method is to encode one object identifier per frame, either in the frame or corresponding audio track segment. Then, the system sends a screen location selected by a user and the identifier to the server. The object identifier plays a similar role as the previous method, namely, it identifies the object. The location information may be used along with the object identifier to form an index into a database to look up a database entry corresponding to a video object.

Alternatively, the watermark may contain several identifiers and corresponding locations defining the screen location of a related video object. The screen location selected by the user determines which identifier is sent to the server for linked information or actions. In other words, a process at the end-user side maps the location of the user selection to an identifier based on the locations encoded along with the identifiers in the content. For example, a segment of the audio track that is intended to be played with a corresponding video frame or frame sequence may include a watermark or watermarks that carry one or more pairs of identifier and locations. These watermarks may be repeated in audio segments synchronized with video frames that include corresponding linked video objects. Then, in the decoding process, the identifier closest to the location of the user interaction is used. A modification includes providing bounding locations in the watermark and determining whether the user's selection is within this area, as opposed to using the closest watermark location to the user's selection.

Other context information available at decoding time may be used to create an association between a video object in a frame and a corresponding action or information in a database. For example, the frame number, screen coordinates of a user selection, time or date may be used in conjunction with information extracted from the watermark to look up a database entry corresponding to a video object in a video sequence.

The manner in which the embedded data is used to create an association between video objects and related information or actions impacts how that data is embedded into each frame. For example, if the watermark includes location information, an object identifier can be embedded throughout the frame in which the corresponding object resides, rather than being located in a portion of the frame that the object overlaps. If the frame includes two or more linked video objects, the watermark conveys an object identifier and location for each of the video objects.

Additional decoding side issues impacting the encoding process include: 1) enabling the user to select video objects during playback; and 2) mapping a user's input selecting a video object to the selected video object. The user can select a video object in various ways. For example, gestural input devices, such as a mouse, touch screen, etc. enable the user to select a video object by selecting a screen location occupied by that object. The selected location can then be mapped to information extracted from a watermark, such as an object identifier. The object identifier of a video object that overlaps the selected location can be looked up based on location codes embedded in the watermark or by looking up the object identifier extracted from a watermark in a video object layer at the selected location.

If a user interface on the decoding side provides additional information about watermarked video objects, like graphical icons, menus, etc., then the user can select a video object by selecting a graphic, menu item, or some other user interface element associated with that object. There are many ways to select graphics or menu items, including gestural input devices, keyboards, speech recognition, etc. This approach creates an additional requirement that the decoding side extract watermark information and use it to construct a graphical icon or menu option to the user. The decoding process may derive the information needed for this user interface from the video content, from a watermark in the content, or from out-of-band auxiliary data. In the latter two cases, the embedding process encodes information into the content necessary to generate the user interface on the decoding side.

An example will help illustrate an encoding process to facilitate user selection of video objects on the decoding side. Consider an example where a watermark encoder encodes a short title (or number) and location of marked video objects into the video stream containing these objects. The decoding process can extract the title and location information, and display titles at the locations of the corresponding video objects. To make the display less obtrusive to the playback of the video, the display of this auxiliary information can be implemented using small icons or numbers superimposed on the video during playback, or it can be transmitted to a separate device from the device displaying the video. For example, the video receiver can decode the information from the video stream and send it via wireless transmission to an individual user's hand held computer, which in turn, displays the information and receives the user's selection.

There a number of different embedding scenarios for encoding information into a video stream to link video objects with information or actions. FIGS. 2–5 illustrate some examples. In FIG. 2, physical objects 200 are pre-watermarked in a manner that survives the video capture process 202. For an example of a watermarking process that survives digital to analog conversion (e.g., printing a digital image on a physical object), and then analog to digital conversion (e.g., capture via a video camera), see U.S. Pat. No. 5,862,260, and in co-pending patent application Ser. No. 09/503,881, filed Feb. 14, 2000. These approaches are particularly conducive but not limited to applications where the objects are largely flat and stationary, such as billboards, signs, etc. The video capture process records the image on the surface of these objects, which is encoded with a watermark. The resulting video is then transmitted or broadcast 204.

In the process of FIG. 3, a video creation process composites watermarked video objects 300 with a video stream 302 to create a watermarked video sequence. The watermark may be encoded into video object layers. Examples of watermark encoding and decoding technology are described in U.S. Pat. No. 5,862,260, and in co-pending applications Ser. No. 09/503,881, filed Feb. 14, 2000, and WO 99/10837.

A compositing operation 304 overlays each of the video objects onto the video stream in depth order. To facilitate automated compositing of the video object layers, each of the objects has depth and transparency information (e.g., sometimes referred to as translucency, opacity or alpha). The depth information indicates the relative depth ordering of the layers from a viewpoint of the scene (e.g., the camera position) to the background. The transparency indicates the extent to which pixel elements in a video object layer allow a layer with greater depth to be visible. The video generated from the compositing operation sequence is broadcast or transmitted to viewers.

The video objects may be encoded with watermarks as part of a compression process. For example, the MPEG 4 video coding standard specifies a video compression codec in which video object layers are compressed independently. In this case, the video object layers need not be composited before they are transmitted to a viewer. At the time of viewing, an MPEG 4 decoder decompresses the video object layers and composites them to reconstruct the video sequence.

The watermark may be encoded into compressed video object layers by modulating DCT coefficients of intra or interframe macroblocks. This watermark can be extracted from the DCT coefficients before the video objects are fully decompressed and composited.

FIG. 4 illustrates another embedding process for encoding auxiliary information about video objects in a video stream 400. In this embedding process, a user designates a video object and the auxiliary information to be encoded in the video object via a video editing tool 402. A watermark encoding process 404 encodes the auxiliary information into the content. A transmitter 406 then transmits or broadcasts the watermarked content to a viewer.

The watermark encoder may encode auxiliary information throughout the entire video frame in which at least one marked video object resides. For example, the user may specify via the editing tool the location of two or more video objects by drawing a boundary around the desired video objects in a video sequence. The encoding process records the screen location information for each object in the relevant frames and associates it with the auxiliary information provided by the user, such as an object identifier. The encoder then creates a watermark message for each frame, including the screen location of an object for that frame and its object identifier. Next, it encodes the watermark message repeatedly throughout the frame.

An alternative approach is to encode auxiliary information for an object in the screen location of each frame where a video object layer for that object resides (described fully in FIG. 6 below).

FIG. 5 is a diagram depicting yet another process for embedding auxiliary information about video objects in a video stream. This process is similar to the one shown in FIG. 4, except that the position of video objects is derived from transmitters 500–504 attached to the real world objects depicted in the video scene and attached to video cameras. The transmitters emit a radio signal, including an object identifier. Radio receivers 506 at fixed positions capture the radio signal and provide information to a pre-processor 508 that triangulates the position of each transmitter, including the one on the active camera, and calculates the screen location of each transmitter in the video stream captured by the active camera. The active camera refers to the camera that is currently generating the video stream 510 to be broadcast or transmitted live (or recorded for later distribution). In a typical application, there may be several cameras, yet only one is selected to provide the video stream 510 at a given time.

Next, an encoding process 512 selects video objects for which auxiliary information is to be embedded in the video stream. The selection process may be fully or partially automated. In a fully automated implementation, a programmed computer selects objects whose screen location falls within a predetermined distance of the 2D screen extents of a video frame, and whose location does not conflict with the location of other objects in the video frame. A conflict may be defined as one where two or more objects are within a predetermined distance of each other in screen space in a video frame. Conflicts are resolved by assigning a priority to each object identifier that controls which video object will be watermark enabled in the case of a screen location conflict.

In a partially automated implementation, the user may select one or more video objects in frames of the video stream to be associated with embedded watermark information via a video editing system 514. The video editing system may be implemented in computer software that buffers video frame data and associated screen location information, displays this information to the user, and enables the user to edit the screen location information associated with video objects and select video objects for watermark encoding.

After calculating video object locations and selecting them for watermark encoding, a watermark encoding process 516 proceeds to encode an object identifier for each selected object. The watermark may be encoded in screen locations and frames occupied by a corresponding video object. Alternatively, object identifiers and corresponding screen location information may be encoded throughout the video frames (or in the audio track of an audio visual work).

After watermark encoding, a transmitter 518 transmits or broadcasts the video stream to viewers. The video stream may also be stored, or compressed and stored for later distribution, transmission or broadcast. The watermarks carrying object identifiers, and other object information, such as screen location information, may be encoded in uncompressed video or audio, or in compressed video or audio.

Figure 6:
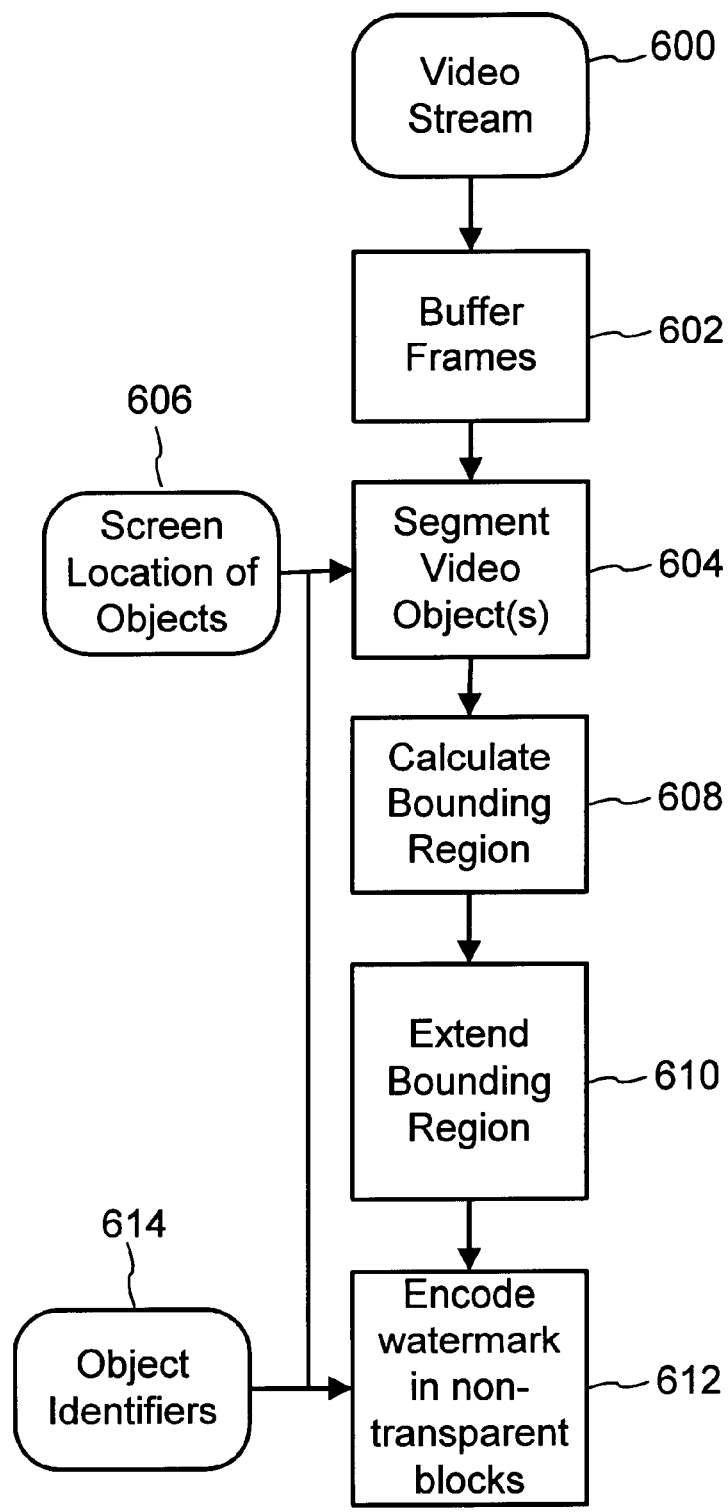
FIG. 6 depicts an example watermark encoding process.

FIG. 6 depicts an example watermark encoding process that may be used in some of the systems described in this document. Depending on the implementation, some of the processing is optional or performed at different times. The watermark encoding process operates on a video stream 600. In some cases the stream is compressed, segmented into video object layers, or both compressed and segmented into video objects as in some video content in MPEG 4 format. The encoder buffers frames of video, or segmented video objects (602).

In this particular example, the encoder embeds a different watermark payload into different portions of video frames corresponding to the screen location of the corresponding video objects. For example, in frames containing video object 1 and video object 2, the encoder embeds a watermark payload with an object identifier for object 1 in portions of the frames associated with object 1 and a watermark payload with object identifier for object 2 in portions of the frames associated with object 2. To simplify decoder design, the watermark protocol, including the size of the payload, control bits, error correction coding, and orientation/synchronization signal coding can be the same throughout the frame. The only difference in the payloads in this case is the object specific data.

A variation of this method may be used to encode a single watermark payload, including identifiers and screen locations for each watermark enabled object, throughout each frame. While this approach increases the payload size, there is potentially more screen area available to embed the payload, at least in contrast to methods that embed different payloads in different portions of a frame.

Next, the encoder optionally segments selected video object instances from the frames in which the corresponding objects reside. An input to this process includes the screen locations 606 of the objects. As noted above, the screen locations may be provided by a user via a video editing tool, or may be calculated based on screen location coordinates derived from transmitters on real world objects. The screen extents may be in a coarse form, meaning that they do not provide a detailed, pixel by pixel definition of the location of a video object instance. The screen extents may be as coarse as a bounding rectangle or a polygonal shape entered by drawing a boundary around an object via a video editing tool.

Automated segmentation may be used to provide refined shape, such as binary mask. Several video object segmentation methods have been published, particularly in connection with object based video compression. The implementer may select a suitable method from among the literature that satisfies the demands of the application. Since the watermark encoding method may operate on blocks of pixels and does not need to be precise to the pixel level due to human interaction, the segmentation method need not generate a mask with stringent, pixel level accuracy.

In some implementations, video objects are provided in a segmented form. Some examples of these implementations are video captured of a physical object (e.g., actor, set, etc.) against a green screen, where the green color of the screen helps distinguish and define the object shape (e.g., a binary mask where a given green color at a spatial sample in a frame indicates no object, otherwise, the object is present).

Next, the encoder computes a bounding region for each object (608), if not already available. The bounding region of a video object instance refers to a bounding rectangle that encompasses the vertical and horizontal screen extents of the instance in a frame. The encoder expands the extents to an integer multiple of a watermark block size (610). The watermark block size refers to a two dimensional screen space in which the watermark corresponding to a video object, or set of objects, is embedded in a frame at a given encoding resolution.

The watermark encoder then proceeds to embed a watermark in non-transparent blocks of the bounding region. A non-transparent block is a block within the bounding region that is not overlapped by the video object instance corresponding to the region. The watermark for each block includes an object specific payload, such as an object identifier, as well as additional information for error correction and detection, and signal synchronization and orientation. The synchronization and orientation information can include message start and end codes in the watermark payload as well as a watermark orientation signal used to synchronize the detector and compensate for changes in scaling, translation, aspect ratio changes, and other geometric distortions.

There are many possible variations to this method. For example, an object specific watermark may be encoded throughout a bounding rectangle of the object. This approach simplifies encoding to some extent because it obviates the need for more complex segmentation and screen location calculations. However, it reduces the specificity with which the screen location of the watermark corresponds to the screen location of the video object that it is associated with. Another alternative that gives fine screen location detail, yet simplifies watermark encoding is to embed a single payload with object identifiers and detailed location information for each object. This payload may be embedded repeatedly in blocks that span the entire frame, or even in a separate audio track.

In some watermark encoding methods, the watermark signal may create visible artifacts if it remains the same through a sequence of frames. One way to combat this is to make the watermark signal vary from one frame to the next using a frame dependent watermark key to generate the watermark signal for each block. Image adaptive gain control may also be used to reduce visibility.

Decoding Processes

There are a variety of system configurations enabling users to access watermark enabled features in video objects. Before giving some examples, we start by defining decoder processes. The examples then illustrate specific system configurations to implement these processes.

Figure 7:
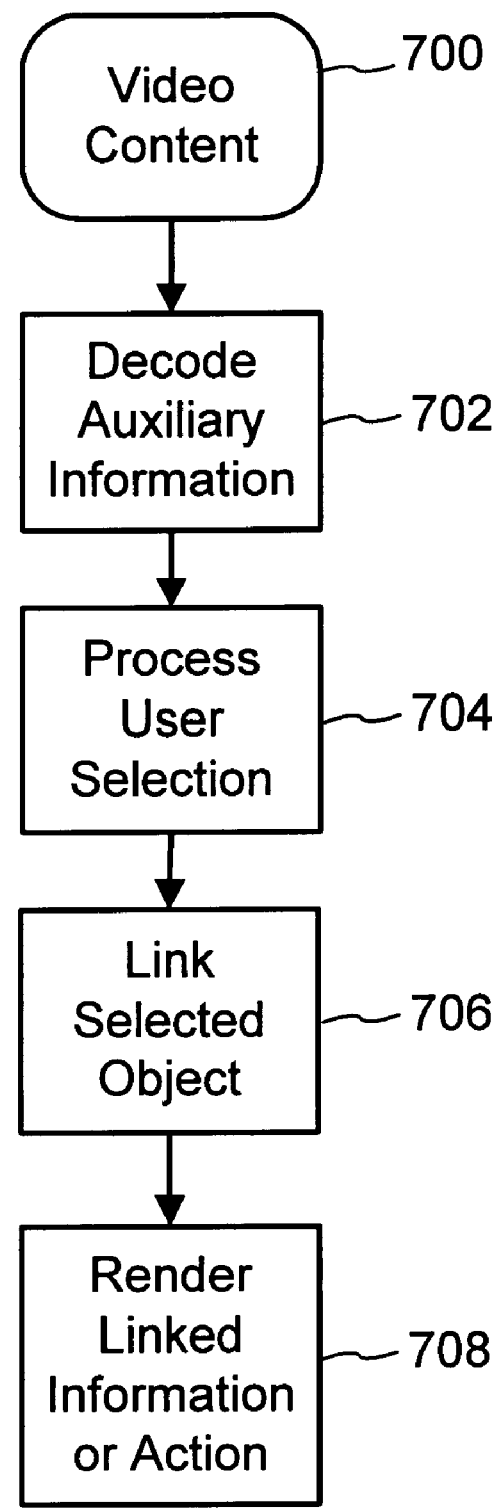
FIG. 7 is a diagram depicting decoding processes for extracting watermark information from video content and using it to retrieve and render external information or actions.

As depicted in FIG. 7, there are five principal decoding processes: 1) decoding auxiliary information embedded in a watermark in the video content (700, 702); 2) user selection of watermark enabled information or actions (704); 3) determining information or actions associated with a video object (706); and 4) rendering watermarked enabled information or actions to the user (708). Rendering may include generating visual, audio or audio-visual output to present information and options for selecting more information or actions to the user, executing a program or machine function, or performing some other action in response to the watermark data.

The first process extracts auxiliary information, such as object identifiers and screen locations, from the video stream or an accompanying audio track. The next process implements a user interface to indicate to the user that the video has watermark enabled objects and to process user input selecting watermark enabled information or actions. The third process determines the information or action associated with a selected video object. Finally, the fourth renders watermarked enabled information or actions to the user.

Each of these decoding processes need not be implemented in all applications. A decoder may operate continuously or in response to a control signal to read auxiliary information from a watermark, look up related information or actions, and display it to the user. Continuous decoding tends to be less efficient because it may require a watermark decoder to operate on each frame of video or continuously screen an audio track. A more efficient approach is to implement a watermark screen that invokes a watermark decoder only when watermark data is likely to be present. A control signal sent in or with the video content can be used to invoke a watermark decoder. The control signal may be an in-band signal embedded in the video content, such as a video or audio watermark. For example, a watermark detector may look for the presence of a watermark, and when detected, initiate a process of decoding a watermark payload, accessing information or actions linked via an object identifier in the payload, and displaying the linked information or actions to the user. The control signal may be one or more control bits in a watermark payload decoded from a watermark signal.

The control signal may also be an out-of-band signal, such as tag in a video file header, or a control signal conveyed in a sub-carrier of a broadcast signal.

The control signal can be used to reduce the overhead of watermark decoding operations to instances where watermarked enabled objects are present. The decoder need only attempt a complete decoding of a complete watermark payload when the control signal indicates that at least one video object (e.g., perhaps the entire frame) is watermark enabled.

The control signal may trigger the presentation of an icon or some other visual or audio indicator alerting the user that watermark enabled objects are present. For example, it may trigger the display of a small logo superimposed over the display of the video. The viewer may then select the icon to initiate watermark decoding. In response, the watermark decoder proceeds to detect watermarks in the video stream and decode watermark payloads of detected watermarks. Additionally, when watermark payloads for one or more objects are detected, the user interface can present object specific indicators alerting the user about which objects are enabled. The user can then select an indicator to initiate the processes of determining related information or actions and presented the related information or actions to the user.

Another way to reduce watermark decoding overhead is to invoke watermark decoding on selected portions of the content in response to user selection. For example, the decoder may be invoked on portions of frames, a series of frames, or a portion of audio content in temporal or spatial proximity to user input. For example, the decoding process may focus a watermark decoding operation on a spatial region around a screen location of a video display selected by the user. Alternatively, the user might issue a command to look for enabled content, and the decoding process would initiate a watermark detector on frames of video or audio content in temporal proximity to the time of the user's request. The decoding process may buffer frames of the most recently received or played audio or video for the purpose of watermark screening in response to such requests.

Example Configurations

One configuration is video player with an interactive user interface that displays video content and implements watermark enabled features. In this configuration, the player decodes the watermark, displays video content, and enables the user to select video objects via its interactive user interface. The player may have a local database for looking up the related information or action of an identifier extracted from a video object.

Figure 8:
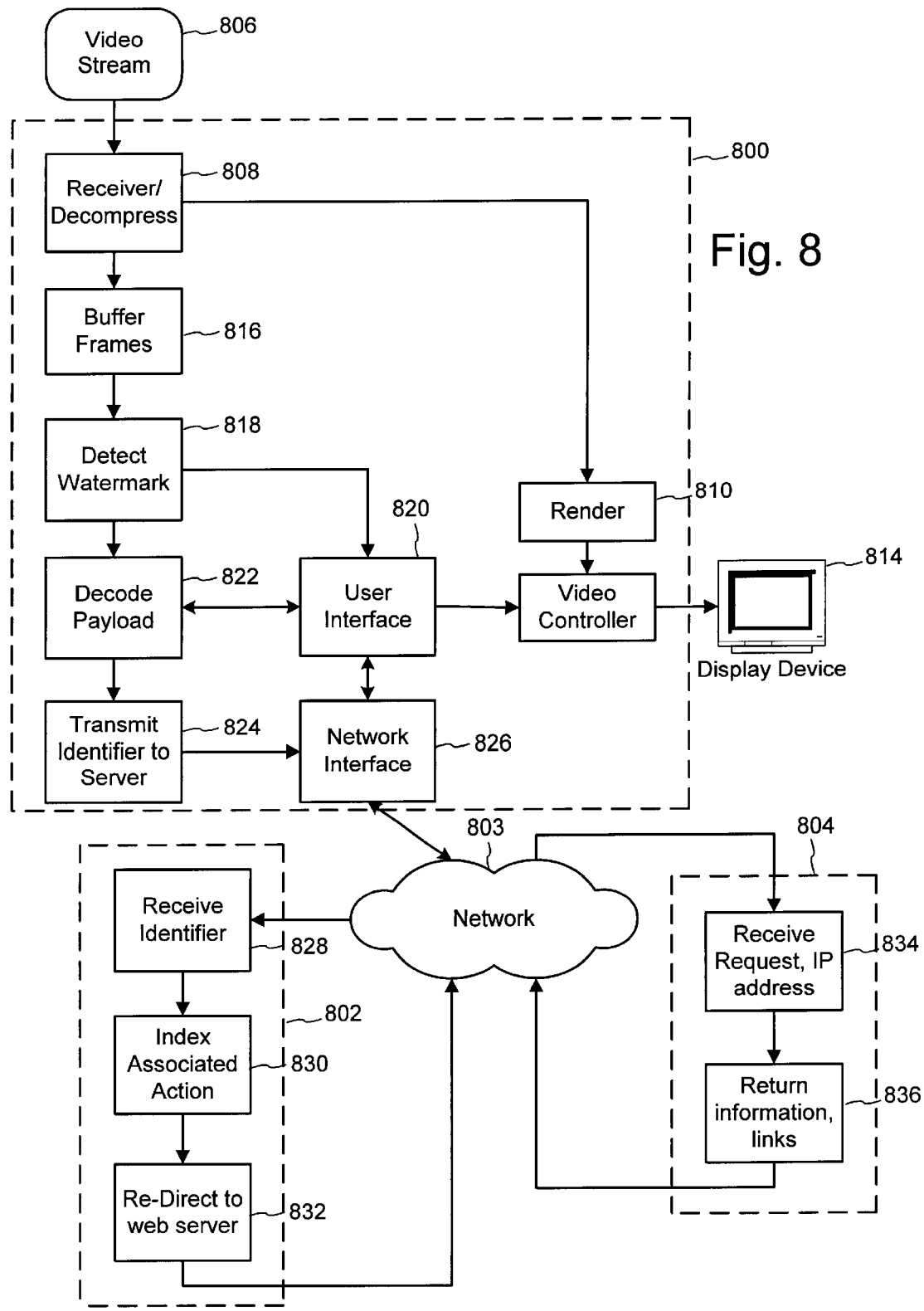
FIG. 8 illustrates an example configuration of a decoding process for linking video objects to auxiliary information or actions.

FIG. 8 illustrates an example configuration of a decoding process for linking video objects to auxiliary information or actions. In this configuration, there are three primary systems involved in the decoding process: 1) A local processing system (e.g., PC, set-top box, stand-alone device) 800 responsible for receiving video content, playing it on a display, and decoding watermarks from the content. 2) A router 802 that communicates with the local processing system via a network 803 such as the Internet; and 3) a web server 804 that communicates with the local processing system and the router via the network. The local processing system may be implemented in a variety of consumer electronic devices such as a personal computer (PC), set-top box, wireless telephone handset, television, etc. The router and web server may similarly be implemented in a variety of systems. In typical Internet applications, the router and web server are implemented in server computers. For these applications, communication of data among the local processing system, router and server may be performed using network protocols, such as TCP/IP, and other application level protocols such as XML, HTTP, and HTML.

The local processing system 800 receives a video stream 806 via a receiver 808. The type of receiver depends on the nature of the video transmission, such as Internet download or streaming delivery, satellite broadcast, cable television broadcast, television broadcast, playback from portable storage device such as VHS tape, DVD, etc. In each case, an appropriate device, such as network adapter, satellite dish, tuner, DVD driver, etc. receives the content and converts it to a video signal. This process may also included decompressing a compressed video file. However, as noted above, the watermark may be encoded and decoded from compressed video or audio, such as MPEG 4 video objects or audio.

The local processing system renders the video content 810. In a PC, the rendering process includes converting the video signal to a format compatible with the video controller in the computer and writing the video to video memory in the video controller 812. The video controller 812 then displays the video signal on a display device 814.

As the video is being rendered, the local processing system buffers frames (816) of audio or video for watermark detecting and decoding. In a PC, the buffering may be integrated with rendering the video to video memory or may be implemented as a separate process (e.g., allocating separate video buffers in main memory or video memory). Also, depending on the nature of the video signal and encoding process, the buffer may store frames of compressed video content or decompressed video content from which watermarks are detected and decoded.

A watermark detector screens the buffered content for the presence of a watermark (818). If a watermark is present, it sends a message to a user interface application 820, which in turn, generates a graphical logo or other visual or audio signal that indicates the presence of watermarked enabled video objects.

A watermark decoder 822 reads one or more watermark payloads from the content. As noted above, the decoder may be triggered by one or more of the following events: 1) the detector finding the presence of a watermark; 2) an out-of-band control signal instructing the decoder to detect and decode a watermark; 3) user selection of the graphical logo, etc.

In addition to displaying an indicator of watermark enabled objects, the user interface 820 also manages input from the user for selecting video objects and for controlling the display of information associated with selected video objects. In a PC environment, the user interface can be implemented as an interactive display with graphics that respond to input from a gestural input device, such as a mouse or other cursor control device, touch screen, etc. This interactive display is superimposed on the display of the video stream. In this environment, the user selects a video object by placing a cursor over the video object on the display and entering input, such as clicking on a mouse.

The specific response to this input depends on the implementation of the watermark decoder and how the content has been watermarked. In one class of implementations, the watermark payload contains information for each watermark enabled object in the video content, along with a location codes specifying screen locations of the objects. In this type of implementation, the decoder preferably decodes the watermark payload in response to detecting presence of a watermark and stores the payload for the most recently displayed video content. In response to user input selecting a video object, the decoder receives the coordinates of the user selection and finds the corresponding location code in the watermark payload information that defines a screen area including those coordinates. The location code is specified at a reference frame resolution, and the user selection coordinates are normalized to this reference resolution.

In another class of implementations, video frames contain one or more watermarks, the payloads in those watermarks are specific to the video objects in which they are embedded.

There are a couple of alternative ways of mapping the location of a user selection to a corresponding watermark payload. One approach to decoding the video frame is to decode watermark payloads for each watermark detected in the frame, and then store screen location data indicating the location of the watermark containing that payload. The screen coordinates of a user's selection can then be mapped to a payload, and specifically to the object identifier in the payload, based on the screen location data of the watermark.

Another approach to decoding is to execute a decode operation on a specific temporal and spatial region in proximity to the temporal and spatial coordinates of a user selection. The temporal coordinates correspond to a frame or set of frames, while the spatial coordinates correspond to a two-dimensional region in the frame of set of frames. If the decoder can decode a watermark payload from the region, then it proceeds to extract the object identifier and possibly other information from the payload. If the decoder is unsuccessful in decoding a payload from the region, it may signal the user interface, which in turn, provides visual feedback to the user that the attempt to access a watermark enabled feature has failed, or it may search frames more distant in time from the user's selection for a watermark before notifying the user of a failure.

The watermark decoder can enhance the user's chances of selecting a watermarked enabled object by providing graphical feedback in response to user selection of the video frame or object within the frame. For example, the decoder can give the user interface the screen coordinates of areas where a watermark has been detected. Screen areas that correspond to different watermark payloads or different object locations as specified within a watermark payload can be highlighted in different color or some other graphical indicator that distinguishes watermark enabled objects from unmarked objects and each other.

The decoder forwards an object identifier (824) for the video object at the selected location to the server 802 via a network interface 826. The decoder may also provide additional information from the watermark or context information from the local processing system. For Internet applications, the decoder sends a message including this information to the server in XML format using HTTP. Before forwarding the message, the user interface may be designed to prompt the user with a dialog box requesting the user to confirm that he or she does want additional information.

The network interface 826 forwards the message to the server 802 over the network. While this example is particularly directed to computer networks like the Internet, similar systems may be built for other types of networks, like satellite broadcast networks, wireless phone networks, etc. In these types of networks, the network interface corresponds to the device and accompanying programming that sends and receives data over a communication link. In the case of wireless device, the network interface may be a cellular telephone transceiver. In the case of the satellite broadcast network, the network interface may be a satellite dish. Note that combinations of technologies may be used for transmitting and receiving functions, such as sending data via telephone network using a modem or network adapter, and receiving data via a satellite dish.

The server, in response to receiving the message (828), parses it and extracts an index used to look up a corresponding action in a database (830) that associates many such indices to corresponding actions. The index may include the object identifier and possibly other information, such as time or date, a frame identifier of the selected object, its screen location, user information (geographic location, type of device, and demographic information), etc. Several different actions may be assigned to an index. Different actions can be mapped to an object identifier based on context information, such as the time, date, location, user, etc. This enables the server to provide actions that change with changing circumstances of the viewer, content provider, advertiser, etc. Some examples include returning information and hyperlinks to the user interface 820 (e.g., a web page), forming and forwarding a message to another server (e.g., re-directing an HTTP request to a web server), recording a transaction event with information about the selected object and user in a transaction log, downloading to the local processing system other media such as still image, video or audio content for playback, etc.

Another action that may be linked to the video object is connecting the user to a transaction server. The transaction server may enable the user to purchase a physical object depicted in the video object via an electronic transaction. It may also enable the user to enter into a contract electronically to obtain usage rights in the video content or related content.

In the example configuration depicted in FIG. 8, the server 802 looks up the address of a web server associated with the index (830). It then forwards an HTTP request (832) to the web server 804 at this address and provides the IP address of the local processing system 800. In addition, it may also include in the HTTP request that the web server may use to tailor a response to the local processing system, such as the object identifier, frame identifier, user demographics, etc.

The web server receives the request (834) and returns information to the local processing system (836). This information may include hyperlinks to other information and actions, programs that execute on the local processing system, multimedia content (e.g., music, video, graphics, images), etc. One way to deliver the information is in the form of an ITML document, but other formats may be used as well.

The local processing system receives the information from the server 804 through the network and the network interface 826. The decoder operates in conjunction with the user interface application such that the information is addressed to the user interface. For Internet applications, a TCP/IP connection is established between the user interface application and the network. The server forwards the information to the IP address of the user interface application. The user interface then formats the information for display and superimposes it onto the video display. For example, when the information is returned in the form of HTML, the user interface application parses the HTML and formats it for display on display device 814. The rendered HTML is layered onto the video frames in the video memory. The video controller 812 then displays a composite of the HTML and the video data. In the event that the HTML includes hyperlinks, the user interface processes inputs to these links in a similar fashion as an Internet browser program.

Just like the servers may map a watermark payload to different actions for different circumstances, the user interface may also implement a set of rules that govern how it presents content returned from the network based on context information. For example, the user interface may keep track of information that a user has scene before and change it or tailor it based on user information or user preferences entered by the user. For example, the user can configure the user interface to display information about certain topics (news categories like sports, business, world affairs, local affairs, entertainment, etc.) or actions (e.g., links to certain categories of electronic buying transactions, video or music downloads, etc.). Then, when the user interface receives information and links to actions, it filter the information and links based on user preference and provide only information and links in the user's preference.

One potential drawback of the above configuration is that it may create conflicts among viewers. People often watch TV in a shared environment, whereas they work on the Internet in a personal environment. This environment creates a conflict when one viewer selects an object to get information that interferes with another viewer's enjoyment of the video program.

Figure 9:
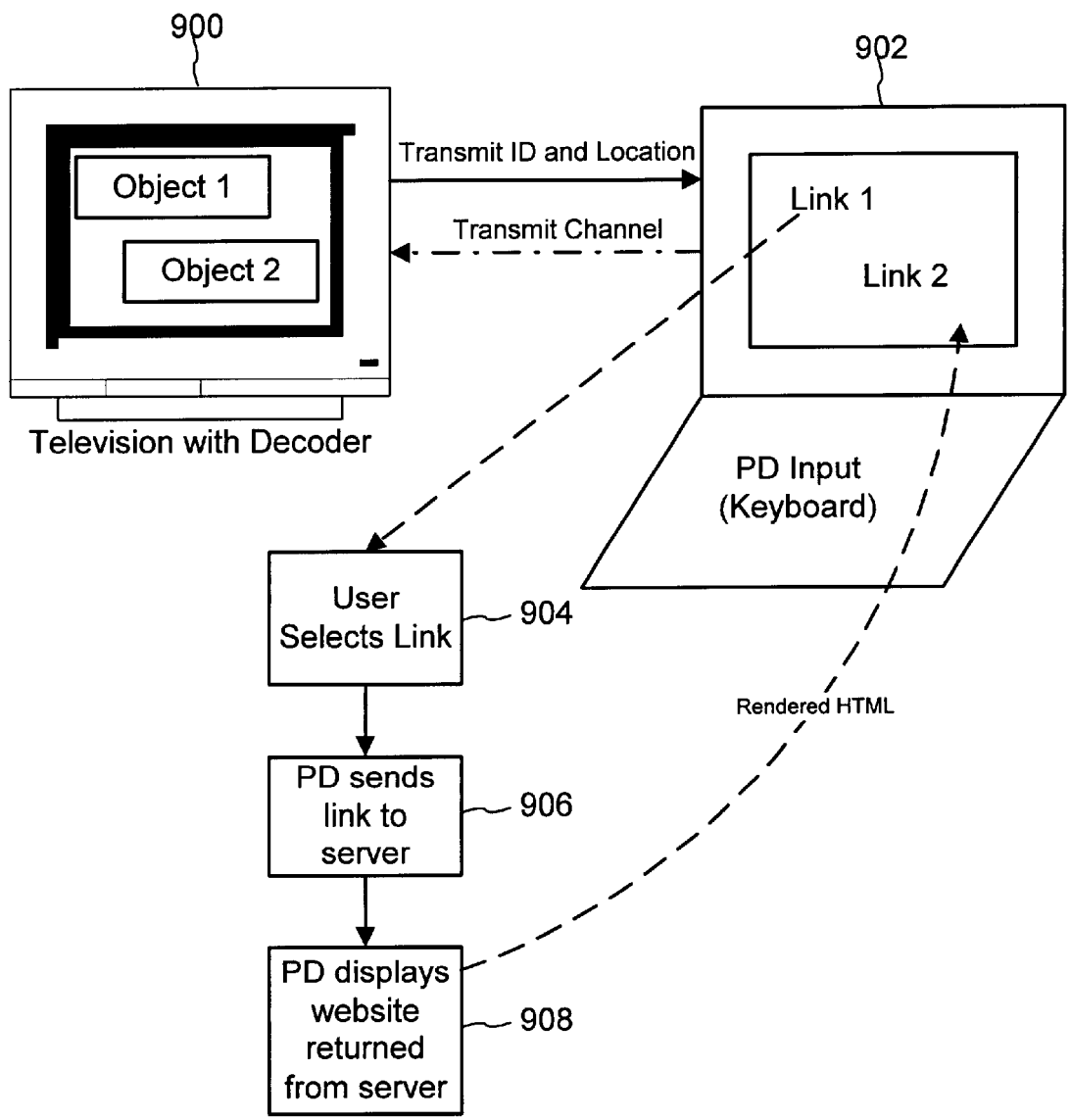
FIG. 9 illustrates another example configuration of a decoding process for linking video objects to auxiliary information or actions.

One solution is to provide consumers with their own personal and portable Internet personal device (PD) as shown in FIG. 9. The system may be configured to have the decoding process in a TV, set-top box, or other receiver 900 of a video stream. The decoder may then transmit watermark IDs, locations, and potentially other context information to the PD 902.

As another alternative, the decoder may be located in the PD. For example, the PD may be equipped with a microphone that captures the audio signal emitted from the speaker of the television. The PD digitizes the audio signal and extracts watermarks from it, which include object information used to link video objects to information or actions. For example, the object information may include object identifiers and location codes for video objects in the video program. The PD may also include a camera, and perform similar actions on watermarks in the video frames.

Two parts of this configuration are: 1) a transmitting device like the television 900 shown in FIG. 9, set-top box, etc., and 2) a receiving PD 902 such as a personal digital assistant (PDA) with a wireless connection to the Internet, or a remote control. The receiving PD can perform the functions of enabling the user to select a video object, retrieving the linked information or actions for the selected object, and rendering them on its user interface. One example of such a device is a PD with a communication link (e.g., infrared, radio, etc.) to the transmitting device for receiving object information and a communication link with a network, database, server, etc. for retrieving the linked information or actions for the selected object. As another alternative, the receiving PD acts solely as a user control device of the transmitting device that enables the user to select an object and communicates the selection back to the transmitting device. The transmitting device, in response to the user selection, retrieves linked information or actions for the selected object and renders them. One example of such a device is a remote control with a user interface (e.g., display and cursor control device for selecting objects) and a two-way communication link with the transmitting device (e.g., infrared, radio, etc.).

Transmitting Device

The transmitter could be a stand-alone device or part of a set-top box that already exists for your TV. The stand-alone device can be a small transmitter that attaches to coaxial cable and transmits a video object identifier and its location during the TV show. If this stand-alone device is connected before the channel has been chosen, it can transmit the IDs and locations for all channels, and the receiving PD can be used to choose the channel you are watching. Alternatively, the receiving PD can transmit an identifier of the channel you are watching to the transmitting device, so it, in turn, only transmits the information for the desired channel.

A less complex stand-alone solution, thus less expensive to manufacture and sell, is to add this stand-alone device after the channel has been chosen, possibly between your VCR or set-top box and your TV, and have it transmit information for the channel you are watching. Finally, this stand-alone device can be OEM hardware that is added inside the TV by the manufacturer or as a post buying solution (i.e. retro-fit).

The set-top box solution may use a Web, Cable or Digital TV set-top box, especially if the existing box is already interactive. Otherwise, OEM hardware could be provided for the set-top box manufacturer.

The transmission scheme can use any method, such as IR or radio waves (e.g., Bluetooth wireless communication), to transmit this minimal amount of information. IR ports are advantageous because most laptops and PDAs already have IR ports. If the set-top box already has a transmission protocol, the transmission scheme should use that scheme. If this scheme is not applicable with an existing receiving PD, a special attachment can be developed and feed into the receiving PD via existing input devices, such as IR, serial, parallel, USB, or IEEE firewire inputs.

Receiving PD

The receiving PD may be a laptop computer, Palm pilot, digital cell phone, or an Internet appliance (such as a combined PDA/Cell Phone/Audio/Video device). This PD would display the links in their relative location on a screen matching the TV screens aspect ratio. Then, using the PD you can select the desired link, possibly by clicking on the link, pressing the appropriate number key relating to the link number, or saying the link number and using speech recognition (906). Next, the PD sends information about the selected link to a database (e.g., a web server that converts the information into a web page URL and directs the server at this URL to return the corresponding web page to the PD) (908). A user interface application running in the PC then renders the web page (910) on its display. Using this approach, the links are dynamic and the data required to describe a link is minimal. This allows the watermarking and transmitting process to be easier. Most importantly, fewer bits need to be transmitted since only an ID and not the complete link are required.

Alternatively, if the receiving PD is connected to the Internet, new and hot information can automatically be pushed to the receiving PD, rather than requiring the user to click on the link. For example, if you are watching a basketball game, the current stats of the player with the ball can be pushed. Or, if you are watching a concert, the location on the tour can be presented. This push feature can be always-on or controlled by the user.

The configuration shown in FIG. 9 differs from the one shown in FIG. 8 in that decoding of a watermark payload and user selection of a link associated with that payload are performed on separate devices. The functions of receiving and rendering video content, decoding watermark from the content, and linking to information and actions based on the watermark payload can be performed on separate devices. Many of the features and applications detailed in connection with FIG. 8 also apply to the configuration shown in FIG. 9.

The following sections illustrate several different application scenarios and related watermarking systems and methods that demonstrate the diversity of the technology described above.

Previously Segmented Video

Segmented video streams, such as those supported in MPEG 4 allow the film or video editor to extract a video scene element from the background and embed the isolated video object. The watermark encoder marks a video object layer corresponding to the object in some or all frames in which the object is visible. When the scene element is not large enough to be encoded with at least one watermark block, the editor keys in that frame, defines a new element again and begins a batch embedding along each frame of the time sequence.

The viewer will watch the movie on DVD, VHS, or some other video signal format and be able to link directly to the Internet or other database online or offline by selecting a watermark enabled video object.

Video Objects Captured Through Greenscreeens

The embedding process may embed a live character that has been shot against a greenscreen. This enables a video editor to embed the actor without first extracting him from the background. This video object will later be composited with computer graphics or other live action shot at another time. Watermark embedding technology described above can be integrated with commercially available video compositing software from Discreet Logic, Adobe or Puffin Designs.

Rendered 3D Object Layers

Watermarks may also be embedded in two dimensional image renderings of still or animated 3D graphical objects. The embedded object can be composited with a video stream to form a video program, such as a movie or television programming. This embedded object stays in the video content when converted to other formats such as DVD or VHS without an additional watermark embedding. Conversely, graphical objects that link to information or electronic commerce transactions can be added to a video product, such as a movie, when its converted from one format to another. For example, the video content can be watermark enabled when it is placed on a DVD or VHS for mass distribution.

Physical Objects Captured in Video

Another application is to embed video objects that are static like the basketball backboard or the sportscaster's table or the Jumbotron. This entails masking out the static video object layer in each frame to isolate it from the background in the video sequence. This may be accomplished by creating two separate video feeds from the same camera using one to create the mask for each "frame" and using the other for the actual broadcast signal. The masked area is marked and the two signals are combined and broadcast.

The sportscaster's table could also have a watermark on the actual artwork that scrolls in front of it. This persistent watermark would need no additional masking.

Real Time Object Embedding

Another application is to embed video objects such as the players of a game. Using video object segmentation, this application extracts video objects from the background and embeds them in the video stream before broadcast or other distribution.

Another method is to generate different video streams, each potentially including a different watermark or watermark payload linking video objects in the corresponding video stream to actions or information. In this case, a watermark is embedded in the video captured from a camera that focuses on a particular character, player, or object. In a video production process, a technician selects the video feed from this camera from among feeds from one or more other cameras to be part of the final video program. For example, a camera following a particular player is encoded with an object identifier associated with that player. The technician selects the video feed from this camera (e.g., the Kobe Kamera isolated on the Laker's Kobe Bryant) at intervals during a game and carries the watermark enabling the user to click the frame and access a page of a web site like NBA.com, Lakers.com, etc. that provides information about that player.

Also, a transparent frame could be overlaid on this camera that the view could not see, but the detector could. Just enough pixels would be sent to detect the image.

Yet another method is to compute video objects dynamically at video capture by deriving video object position and screen extents (bounding box, binary mask, shape, etc.) from the real world objects being captured.

Games

Watermarks may be inserted into graphical objects in 3D animation used in video games to link characters and other objects to information or actions. Dreamcast, Playstation 2, and PC CD-ROM games all have Internet access. Images that are rendered on the fly can be embedded with the watermark. Canned animation and cut scenes are rendered previously with the watermark in them. These can activate special website interaction, or for playing online, this could allow extra interaction between players.

Embedding Graphic Overlays

The score area on the bottom of the screen is an excellent place to mark before transmission of the video broadcast.

Real Time embedding is ready for delivery. Every NFL and NBA broadcast now has sophisticated graphics that are keyed on screen.

In addition, another opportunity to mark is when a player's statistics are shown on the NFL game between plays or during a timeout. The screen cuts from the live broadcast to canned animation that includes a composite of the player's picture and his states. This is an excellent opportunity for watermark embedding.

In addition to the real time embedding examples above, one method is to embed a watermark or watermarks in relatively static portions of the background (e.g., watermarking portions of video frames depicting the turf of a playing field). This method would work well since it is stationary and usually fills a large part of the TV screen.

News Broadcasts

Graphics used in news broadcasts can be linked to information and actions via watermarks. CNN, ABC, NBC, CBS, etc. have used keyed images over the anchor's shoulder for years. They are canned graphics that are composited during the broadcast. These canned graphics can be embedded with watermarks as described above.

Virtual Billboards

The virtual billboards displayed advertising from the typical broadcast advertiser. These images can be watermarked to link the virtual billboards to information or actions, like electronic buying opportunities.

Feature Films

Feature films that were not embedded in the original post-production can be embedded afterwards on their way to video, DVD, or other format for electronic or packaged media distribution.

Logos and other Graphic Overlays

Many channels now keep a logo at the bottom right corner of their screen. The History Channel, MTV, VH1, TLC, TNN, all have logos that advertise the channel. These logos are sometimes shown throughout the program hour. These logos can be linked to external actions or information by embedding a watermark in either the video signal or the accompanying audio track.

Watermarked Signs

Watermarks may be embedded in the images on large physical objects, such as outdoor signs. These outdoor signs could conceivably be marked and detected onscreen. A typical example would be billboards inside a baseball park or football stadium. When video is captured of these physical objects, the watermarked images on these objects is recorded in the video signal. The watermark is later decoded from the video signal and used to link the video signal to an action or information.

Watermark Enabled Advertising

Video objects representing advertising or promotions may be watermark enabled. For example, an advertiser such as Ford would produce a watermark enabled ad that would pop up specifically for users to click. The promo could be "NFL on ESPN . . . Brought to You By FORD" and while that logo or graphic spins there for twenty seconds Ford is offering a promotional discount or freebie for all the people that click on it to visit there site during that time. The video programmer could run the video objects many times so people who miss it could get another chance.

User Alerts and Preferences

The watermark decoding system may employ a user interface to enable the user to control activation of watermark enabled features. For example, the decoding process may default to an "alert off" status, where the watermark decoder does not alert the user to watermark enabled features unless he or she turns it on. By querying the screen every few seconds, a watermark detector or decoder may alert the user that there are watermark enabled objects present on screen if he/she so chooses. The decoding system may be programmed to allow the user to determine whether or not he/she is alerted to watermarked enabled features, and how often.

In addition, the decoding system may enable the user to set preferences for certain types of information, like sports, news, weather, advertisements, promotions, electronic transactions. The decoding system then sets up a filter based on preferences entered by the user, and only alert the user to watermark enabled features when those features relate to the user's preferences.

Watermark Enabled Commerce

Watermark enabled video objects may be linked to electronic commerce and advertising available on the Internet or from some other information server.

For example, video objects may be linked to opportunities to rent or by the content currently being viewed or related content. At the beginning or end of the film, a watermark enabled logo may be overlayed on a video signal (e.g., from a DVD or other video source) to allow the user to access a website to review the movie, purchase the movie (rent to own), rent/buy the sequel, alert the web site that the rented movie has been viewed to help manage inventory, etc.

Introducing Interactivity into Video Programming

By incorporating watermark enabled video into a television program, the program may be transformed into an interactive experience. For example, a sitcom program could include watermark enabled video objects at selected points in the broadcast or at the opener that alerted the viewer to get online.

Interactive Shopping

Video advertising of products, such as clothing, may be watermark enabled to link video objects representing a product or service to additional information or actions, such as electronic buying transactions. For example, a clothing manufacturer could enable all their broadcast ads. Each piece of clothing on the actor may be watermark enabled and linked to the page on the web site to buy the article.

Real Time Derivation of Video Object Spatial and Temporal Extents

The technology shown in FIG. 5 allows watermark tracking by placing locator devices in physical objects. One example is to place these locators inside the shoes and on the uniforms of professional athletes during games. These locator chips emit a signal that is received and triangulated by detectors on courtside. Each chip has a unique ID to the player. The signal is passed through a computer system integrated into the production room switcher that embeds watermarks into the video stream captured of the player.

The players wear at least two transmitters to give location information relative to the camera position. Using this information, a preprocessor derives the screen location of the corresponding video objects. If transmitters get too close to distinguish a video object, the preprocessor prioritizes each video object based on the producer's prior decision.

Alternatively, the player's jersey could be watermarked, and used like a pre-marked static object.

Linking Audio Objects with Watermarks

Just as audio or video watermarks can be used to link video objects to information or actions, so can they link audio objects to related information or actions. In an audio signal, portions of the signal are distinguishable and recognizable as representing a particular audio source, such as a person's voice or vocal component of a song, an instrument, an artist, composer, songwriter, etc. Each of these distinguishable components represent audio objects. Watermarks in the audio or accompanying video track can be used to link audio objects to information or actions pertaining to the action.

To access linked information or actions, the user selects a portion of the audio signal that includes a watermark enabled audio object, such as by pressing a button when an audio object of interest is currently playing. Using the temporal location of the user selection in the audio signal, a watermark linking process maps the user selection to a corresponding audio object. The systems and processes described above may be used to retrieve and render information or actions linked to the selected audio object.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above. These patents and patent applications provide additional implementation details. They describe ways to implement processes and components of the systems described above. Processes and components described in these applications may be used in various combinations, and in some cases, interchangeably with processes and components described above.

The methods, processes, and systems described above may be implemented in hardware, software or a combination of hardware and software. For example, the watermark encoding processes may be incorporated into a watermark or media signal encoding system (e.g., video or audio compression codec) implemented in a computer or computer network. Similarly, watermark decoding, including watermark detecting and reading a watermark payload, may be implemented in software, firmware, hardware, or combinations of software, firmware and hardware. The methods and processes described above may be implemented in programs executed from a system's memory (a computer readable medium, such as an electronic, optical or magnetic storage device). Additionally, watermark enabled content encoded with watermarks as described above may be distributed on packaged media, such as optical disks, flash memory cards, magnetic storage devices, or distributed in an electronic file format. In both cases, the watermark enabled content may be read and the watermarks embedded in the content decoded from machine readable media, including electronic, optical, and magnetic storage media.

The particular combinations of elements and features in the above-detailed embodiments are exemplary only; the interchanging and substitution of these teachings with other teachings in this and the incorporated-by-reference patents/applications are also contemplated.

What is claimed is:

1. A method for encoding substantially imperceptible auxiliary information into a video signal including at least one video object, the method comprising:

steganographically encoding object specific information about the video object into the video signal; and associating the object specific information with an action, where the action is performed in response to user selection of the video object through a user interface while the video signal is playing.

2. The method of claim 1 wherein the action comprises retrieving information about the video object.

3. The method of claim 2 wherein the action comprises retrieving information about the video object from a remote device.

4. The method of claim 1 wherein the action comprises executing a program.

5. The method of claim 1 wherein the object specific information is encoded in a graphical image that is composited with the video signal.

6. A method for encoding substantially imperceptible auxiliary information into a video signal including at least one video object, the method comprising:

steganographically encoding auxiliary information in a physical object in a manner that enables the auxiliary information to be decoded from a video signal captured of the physical object;

associating the auxiliary information with an action so that the video signal captured of the physical object is linked to the action.

7. The method of claim 6 wherein the action includes retrieving information about the physical object.

8. The method of claim 7 including:

establishing an automated service that is responsive to auxiliary information extracted from the video signal to link the physical object to the action.

9. A method for using a watermark that has been encoded into a video signal, where the watermark conveys information about a video object in the video signal, the method comprising:

decoding the information from the watermark;

receiving a user selection of the video object; and executing an action associated with the information about the video object.

10. The method of claim 9 including:

sending the information about the video object to a database;

using the information about the video object to look up additional information related to the video object.

11. The method of claim 10 including:

using the additional information to form a request to a remote system, which in response to the request, returns information to a user that made the user selection of the video object.

12. The method of claim 11 wherein the remote system is a web server and the web server returns information about the video object to the user.

13. The method of claim 11 wherein the information returned from the remote system includes one or more programs.

14. A machine readable media on which is stored a program for performing the method of claim 9.

* * * * *